US012330311B2

(12) United States Patent
Vu et al.

(10) Patent No.: US 12,330,311 B2
(45) Date of Patent: Jun. 17, 2025

(54) INTELLIGENT MONITORING OF ENTRY POINTS IN MULTI-CELL WORKSPACES

(71) Applicant: SYMBOTIC LLC, Wilmington, MA (US)

(72) Inventors: Clara Vu, Cambridge, MA (US); Scott Denenberg, Newton, MA (US); Marek Wartenberg, Chelsea, MA (US); Ilya Kriveshko, Boxborough, MA (US); Antonio Fiol-Mahon, Cambridge, MA (US); Alberto Moel, Cambridge, MA (US)

(73) Assignee: Symbotic LLC, Wilmington, MA (US)

( * ) Notice: Subject to any disclaimer, the term of this patent is extended or adjusted under 35 U.S.C. 154(b) by 351 days.

(21) Appl. No.: 17/885,617

(22) Filed: Aug. 11, 2022

(65) Prior Publication Data

US 2022/0379474 A1   Dec. 1, 2022

Related U.S. Application Data

(63) Continuation-in-part of application No. 17/375,447, filed on Jul. 14, 2021, now Pat. No. 11,613,017,
(Continued)

(51) Int. Cl.
*G06T 17/05* (2011.01)
*B25J 9/16* (2006.01)
(Continued)

(52) U.S. Cl.
CPC ........... *B25J 9/1666* (2013.01); *B25J 9/1676* (2013.01); *B25J 9/1697* (2013.01); *G01S 7/4808* (2013.01);
(Continued)

(58) Field of Classification Search
CPC .............................. G01S 7/4808; G06T 17/10
See application file for complete search history.

(56) References Cited

U.S. PATENT DOCUMENTS

| 5,574,637 A | 11/1996 | Obata et al. |
| 9,452,531 B2 | 9/2016 | Kikkeri et al. |

(Continued)

FOREIGN PATENT DOCUMENTS

| JP | 03-266101 A | 11/1991 |
| JP | 06-309011 A | 11/1994 |

(Continued)

OTHER PUBLICATIONS

International Search Report and the Written Opinion of the International Searching Authority, for International Application No. PCT/US2020/019658, dated May 20, 2020, 12 pages.
(Continued)

*Primary Examiner* — Edward Park
(74) *Attorney, Agent, or Firm* — Perman & Green, LLP

(57) ABSTRACT

One or more computational strategies is used to reduce the complexity of handling detected point clusters appearing at a portal of a monitored workcell. If the other side of the portal is a second, adjacent workcell, the monitoring system for a first workcell predicts when a human in that workcell may pass through the portal to a second workcell and alerts the monitoring system for the second workcell. The prediction may be based on absolute proximity of a human to the portal or movement toward it. Other strategies are employed if the workcells overlap, or if the portal leads to an unmonitored space.

21 Claims, 8 Drawing Sheets

Related U.S. Application Data which is a continuation of application No. 16/800,427, filed on Feb. 25, 2020, now Pat. No. 11,097,422.

(51) Int. Cl.
| | |
|---|---|
| *G01S 7/48* | (2006.01) |
| *G01S 17/04* | (2020.01) |
| *G01S 17/87* | (2020.01) |
| *G01S 17/89* | (2020.01) |
| *G06T 17/10* | (2006.01) |
| *G01V 8/20* | (2006.01) |

(52) U.S. Cl.
CPC .............. *G01S 17/04* (2020.01); *G01S 17/87* (2013.01); *G01S 17/89* (2013.01); *G06T 17/10* (2013.01); *G01V 8/20* (2013.01); *G05B 2219/40202* (2013.01); *G06T 17/05* (2013.01); *Y10S 901/47* (2013.01); *Y10S 901/49* (2013.01)

(56) References Cited

U.S. PATENT DOCUMENTS

| | | | |
|---|---|---|---|
| 10,099,372 B2 | 10/2018 | Vu et al. | |
| 10,445,944 B2 | 10/2019 | Galera et al. | |
| 10,812,778 B1 | 10/2020 | Wang et al. | |
| 10,899,007 B2 | 1/2021 | Vu et al. | |
| 11,097,422 B2 | 8/2021 | Denenberg et al. | |
| 11,613,017 B2 | 3/2023 | Denenberg et al. | |
| 2005/0224479 A1 | 10/2005 | Watanabe | |
| 2016/0354927 A1 | 12/2016 | Kikkeri et al. | |
| 2017/0302905 A1 | 10/2017 | Shteinfeld et al. | |
| 2018/0151012 A1 | 5/2018 | Kuraoka | |
| 2018/0222052 A1 | 8/2018 | Vu et al. | |
| 2018/0324393 A1* | 11/2018 | Ryan | H04N 7/188 |
| 2020/0206928 A1 | 7/2020 | Denenberg et al. | |
| 2021/0252706 A1* | 8/2021 | Zanchettin | B25J 9/1602 |
| 2022/0019949 A1* | 1/2022 | Shobu | G06Q 50/04 |
| 2022/0379474 A1* | 12/2022 | Vu | G01S 17/87 |
| 2024/0314480 A1* | 9/2024 | Lee | G06F 3/038 |

FOREIGN PATENT DOCUMENTS

| | | |
|---|---|---|
| JP | 11-110041 A | 4/1999 |
| JP | H11-110041 A | 4/1999 |
| JP | 2003-029832 A | 1/2003 |
| JP | 2006-501487 A | 1/2006 |
| JP | 2018-185727 A | 11/2018 |
| JP | 2018/207349 A | 12/2018 |

OTHER PUBLICATIONS

Japanese Office Action, Japanese Application No. 2021-549787, dated Oct. 4, 2022, 5 pages.

Notice of Reasons for Rejection issued in corresponding Japanese Application No. 2021-549787, 5 pages, with English translation.

* cited by examiner

INTELLIGENT MONITORING OF ENTRY POINTS IN MULTI-CELL WORKSPACES

CROSS-REFERENCE TO RELATED APPLICATIONS

This is a continuation-in-part of U.S. Ser. No. 17/375,447, filed on Jul. 14, 2021, which is itself a continuation of U.S. Ser. No. 16/800,427, filed on Feb. 25, 2020. The entire disclosures of both priority documents are hereby incorporated by reference.

FIELD OF THE INVENTION

The field of the invention relates, generally, to monitoring of industrial environments where humans and machinery interact or come into proximity, and in particular to systems and methods for detecting unsafe conditions in a monitored multi-cell workspace.

BACKGROUND

Modern manufacturing generally involves the sequential execution of a set of manufacturing processes (such as welding, painting, and assembly) in fixed workcells through which the work in progress is moved by a means of transport, e.g., conveyor belts, roller stages, vehicles (guided, autonomous, or controlled or driven by a human, such a forklift, cart or dolly), or humans walking or driving between workcells, carrying the work in progress. A simple and well-known arrangement for manufacturing is the assembly line, where the workcells are arranged in a line and connected through conveyor belts or a chain line that moves the work in progress ("workpieces") through a fixed path. A less common alternative is one where the workpieces remain in a workcell and the manufacturing processes are performed in place, with parts and tools traveling to the workcell as needed for the sequential manufacturing steps. This arrangement is common in situations where the item being manufactured is large or too unwieldy to move between workcells.

Still another arrangement is called cellular manufacturing, in which the workcells are arranged flexibly around the factory floor in order to optimize factors such as workpiece transit time, parts delivery, or the mix of work orders. In cellular manufacturing, individual workcells may be "flexible," i.e., capable of performing different process steps on different workpieces according to the mix of products being produced in a time period; some workcells may perform several sequential steps on an individual workpiece. Cellular manufacturing is particularly advantageous in factories with high variation in work orders, because the factory layout and workflow can be quickly or even dynamically reconfigured.

Each workcell includes machinery and fixturing necessary for the relevant process step. For example, a painting workcell may have a painting robot, paint dispensing and protective equipment, and tooling necessary to load and unload the item being painted. The painting workcell will likely also include a computer or electronic control system that can be programmed to run and manage the equipment in the workcell. An assembly workcell may have the fixturing necessary for holding the workpieces to be assembled, tools for the machines or humans carrying out the assembly step, and conveyors or loading equipment to bring the workpieces in and out of the workcell. Similarly, a milling workcell may have a milling machine at its center, together with fixturing and equipment to load and unload the milling machine, either manually or automatically. The milling machine will likely have a computerized numerical control system governing the necessary operations on workpieces.

Workcells can be fully automated, whereby the loading and unloading of workpieces and the manufacturing steps are all performed by machines; fully manual, where all the steps are carried out by humans (likely using hand or power tools); or something in between, where, for example, a machine is loaded or unloaded by a human, or a human carries out a manufacturing step on parts being handled by a machine. Even though automation levels are continually increasing, humans still dominate the factory floor and the majority of factory tasks are performed by humans.

A factory or manufacturing site can consist of only a few workcells (for example, a simple paint shop) or it can have hundreds of workcells, each implementing a manufacturing step such as those in an automotive plant. Workcells can be adjacent to one another, so work in progress is passed from workcell to workcell (via, for example, a conveyor belt, a guide rail, or a gravity chute), or workcells can instead be separated by lanes to allow humans or vehicles to pass. Sometimes, workcells of a certain type (for example, welding or painting workcells) are grouped together in a physical space so all workpieces that need to be painted or welded are brought in and out of the paint or weld shop.

Increasingly, factory process flows and production profiles are controlled via computers, using manufacturing execution systems (MESs) or other factory-control systems. The factory-control systems aggregate factory floor-level state information from the workcells, such as whether they are operating or not, their production rates, fault states, maintenance requirements, and other indicators. More broadly, MESs are used not just in factories, but also in other applications where it is necessary to track the states and conditions of a large number of items and equipment, such as a warehouse or distribution center. The equivalent of an MES system in a warehouse or distribution center is known as a warehouse-management system (WMS). WMSs focus more on the location and availability of goods in storage, but also track the state of specialized workcells used in warehouses, such as picking stations or palletizers.

At the lowest level, this information is collected by field sensors and actuators in the workcell, in the machines in the workcells, or in the areas containing work in progress (or goods in process in a warehouse). These sensors and actuators may continuously collect information on position, pressure, temperature, weight, motion, vibration, or the absence or presence of an indicator from which the state of the machines can be ascertained. This information can also be provided by humans in the workspace, who can ascertain the states of machinery and work in progress and provide that information via human-machine interfaces on the factory floor.

These low-level data points collected by the sensors and actuators or by humans are then aggregated through peripheral devices such as programmable logic controllers (PLCs) or industrial microcontroller units, and up to a supervisory control and data acquisition (SCADA) system. The SCADA (or equivalent) system collects, analyzes, and presents this information to the MES system and to plant operators and workers through graphical and other user interfaces, allowing them to see and respond to the state of the individual workcells and of the entire manufacturing plant. In a warehouse, the SCADA system may focus more on inventory control and item tracking using, for example, bar code scanners and object identification sensors and actuators.

Increasing computational performance and rapidly dropping sensor and actuation costs are driving the adoption of these SCADA and IVIES systems, effectively making manufacturing platforms "smarter." This model for organizing production by introducing perceiving, active, and context-aware manufacturing control systems is often referred to as "Industry 4.0." Instead of an open-loop, low data-intensity static manufacturing process, increasing levels of computerized control are introducing automation and autonomy on the factory floor. Such automation and autonomy add context-awareness to the factory floor so that individual manufacturing steps or workcells can be viewed as services. These services can be then combined in possibly arbitrary ways, allowing for flexible and cost-effective manufacturing even in small lot sizes or with high product variability. Cellular assembly can particularly benefit from automation, because it enables a multi-directional layout in which work in progress is shuttled between workcells on driverless transport systems or autonomous mobile robots. Instead of the fixed conveyor of the assembly line, the autonomous transport systems are guided between workcells by laser scanners, radio-frequency identification (RFID) technology, fiducials, or other guidance and mapping technologies. Such an approach enables quick assembly layout changes and flexible manufacturing.

As noted above, an alternative manufacturing arrangement is one in which the work in progress remains stationary in some steps and the machines and humans performing the work are brought to the workcell on mobile devices, which can be autonomous or driven by humans. For example, in automotive assembly, the car body can remain in a single location while mobile robotic arms (which can be simply a robot mounted on an autonomous vehicle) approach the workcell together with mobile vehicles carrying parts to be mounted on the vehicle (such as tires, doors, or the engine block). The mobile robot can perform its task, possibly in collaboration with humans, and then move on to another workcell with another car body. In the extreme, the workcells themselves can be mobile, performing manufacturing tasks while simultaneously shuttling the work in progress around the factory to additional stationary workcells.

Capital goods manufacturers, such as automakers, experiment with these cellular manufacturing concepts as a solution to the problem of car model diversity. A single model may be available in sedan, hatchback, and convertible versions, but may also be available in different powertrains, such as diesel, plug-in hybrid, or even electric. Some models require more time for wiring electrical systems or installing customer-specific options such as heated seats or sunroofs. This extra time slows down the traditional assembly line where the workcells are adjacent to each other and connected with a conveyor belt or a chain pulling the work in progress, as the line moves along with the slowest manufacturing workcell step. Further, workers and machines in these customer-specific workcells remain idle when cars coming down the assembly line do not require a specific option such as a sunroof. Cellular assembly can speed up the line and reduce idle time by redirecting vehicles to vacant workstations at a steady pace.

Warehouse operators are also increasing the intensity of automation, introducing large numbers of automated guided or autonomous vehicles and robots in addition to automated retrieval and storage systems, conveyors, automated picking stations, palletizers, and depalletizers. These increasing levels of automation mean that humans and machines in warehouses are now increasingly interacting in close proximity to each other, and there is a need for WMSs to manage not just equipment and inventories, but also the humans in the warehouse.

Although these advanced SCADA and MES factory and warehouse control systems are becoming more powerful, flexible, and pervasive, their focus is on the machinery and equipment (both mobile and fixed) on the factory floor, and not on the humans working with and next to the machines being monitored, or on the interactions between the humans and the machines. The vast majority of manufacturing workcells and work in progress transportation in the factory floor still require human input and effort. Humans frequently load and unload machines, carry out manufacturing operations with the support of machines, and move workpieces around the factory. Even "lights out" factory or warehouse floors (which do not require human input during operation) have humans regularly enter the "lights out" space for maintenance, fault recovery, or equipment upgrade.

Because industrial machinery is often dangerous to humans, the most common approach to preventing harm to humans is to keep the humans and machines separate using equipment known as guarding. One very simple and common type of guarding is a cage that surrounds the machinery, configured such that opening the door of the cage causes an electrical circuit to shut down the machinery. This ensures that humans can never approach the machinery while it is operating. More sophisticated types of guarding may involve, for example, optical sensors. Examples include light curtains that determine if any object has intruded into a region defined by one or more light emitters and detectors, and 2D LIDAR sensors that use active optical sensing to detect the minimum distance to an obstacle along a series of rays emanating from the sensor, and thus can be configured to detect either proximity or intrusion into pre-configured 2D zones. Advances in robotic safety controllers have enabled more sophisticated programming of static and dynamic safety regions, allowing closer human-machine interaction.

Some approaches, such as those used with collaborative robots, rely on detecting collisions with the machines through force, torque, or capacitive sensors; limiting forces through active or passive compliance; limiting machine or robot speeds; or cushioning or padding dangerous strike zones or pinch points on the machinery. However, none of these approaches prevents collisions, which limits their viability and usefulness in safety systems.

Moving vehicles (both human-operated and driverless, which can be guided via a positioning system or completely autonomous) pose special problems, as they must prevent unintended collisions with humans on the factory floor while allowing access to the vehicle when relevant, for example, when loading or unloading a goods carrier or entering a forklift. Several solutions have been developed for the safe interaction between mobile vehicles and humans. The simplest approach is to place a strict upper bound on the speed of mobile platforms operating around humans, traveling at speeds slow enough so that they can stop before reaching a human or the human can react quickly enough to avoid colliding with the machine. However, if the vehicle has onboard sensing for safety, and that sensing cannot see around corners, then obstructions in the operating space can allow humans to emerge in proximity to the vehicle, substantially reducing the top speed at which the vehicle can safely travel.

Other approaches involve a passive warning signal or active sensing mounted either on the vehicle or the surrounding environment. Passive approaches include audible signals that can be heard by humans in the area surrounding the moving vehicle, or warning spotlights mounted on the moving vehicle to project a beam ahead and behind the vehicle's path, alerting humans of its presence. A more information-rich passive warning system is the use of 2D cameras, which can be monitored by the vehicle driver either on the vehicle (for example, a human-operated forklift) or remotely. All of these passive approaches have limitations. The audible signals may not be heard by humans on a loud factory floor; the visual signals may not be bright enough or may be occluded by equipment or fixtures; and the 2D cameras rely on constant operator attention to trigger a danger condition, and hence are limited in their ability to prevent accidents.

Active approaches include the use of RFID tags or other transponder methods (such as ultrawideband), which human operators wear while on the factory floor. Receivers on the vehicles or on the surrounding environment can detect these RFID tags or transponders and signal the human or vehicle when a collision or dangerous situation is imminent. Other approaches are based on radar, LIDAR, or ultrasound technologies, usually mounted on the front and rear, or at the corners of moving vehicles. All of these 2D approaches are limited by their ability to clearly detect intrusions in 3D, and are quite sensitive to ambient conditions, such as temperature changes and illumination. Further, their field of view is limited by their orientation and installation on the moving vehicle. A forward-facing 2D LIDAR placed at a corner of a moving vehicle (a frequent application of 2D LIDAR) can only "see" what is in its range of vision, and not behind the vehicle or around corners. Moreover, because it can only do so in 2D, entry of an obstruction from above or below its field of view would go undetected. These vision field-of-view constraints and occlusions limit the operating speed of the vehicle, reducing efficiency and cycle times.

3D sensors include time-of-flight (ToF) cameras and 3D LIDAR sensors. Existing vision-based systems using cameras work well when humans are not occluded, well-separated and clearly visible. Humans who are prone, bending down, or partially occluded by machinery or other humans are much harder to identify and track. Stereo and RGB cameras are also prone to performance variations from changes in environmental conditions, such as temperature, lighting, or vibrations.

Moreover, vision-based systems, particularly 3D systems, may be vulnerable to various forms of interference. For example, ToF cameras may operate by illuminating a scene with a modulated light source and observing the reflected light. The phase shift between the illumination and the reflection is measured and translated to distance. Typically, the illumination is from a solid-state laser or LED operating in the near-infrared (IR) range (~800-1500 nm) invisible to the human eye. An imaging sensor (or sensors) in the camera responsive to the same spectrum receive the light and convert the photonic energy to electrical current, then to charge, and then to a digitized value. The sensor may have an array of near-IR LEDs that may be collectively or selectively activated, in the former case to maximize the emitted ranging radiation and in the latter case to steer or shape the beam. The light entering the sensor(s) has a component due to ambient light and a component from the modulated illumination source. Distance (depth) information is only embedded in the component reflected from the modulated illumination. Therefore, a high ambient component reduces the signal-to-noise ratio (SNR).

To detect phase shifts between the illumination and the reflection, the light source in a 3D ToF camera is pulsed or modulated by a continuous-wave source, typically a sinusoid or square wave. Distance is measured for every pixel in a 2D addressable array, resulting in a range map, which can be turned into a depth map, or collection of 3D points, after projecting the range into 3D space using a computational model. Alternatively, a depth map can be rendered in a 3D space as a collection of points, or a point cloud. The 3D points can be mathematically connected to form a mesh onto which a textured surface can be mapped.

A workspace monitored by 2D or 3D cameras, with images collected at predetermined intervals and examined by a control system to detect hazardous conditions, enable dangerous machinery to operate proximate to, or in collaboration with, human operators. As described in U.S. Pat. No. 10,882,185, for example, a workspace may be divided into a 3D grid of small (5 cm, for example) cubes or "voxels" or other suitable form of volumetric representation. The control system receives images obtained by the cameras, registers the images, and analyzes them in real time to classify 3D regions of the monitored workspace and identify humans and objects therein. Based on safety protocols that prescribe protective separation distances and speed and separation monitoring criteria, the control system restricts operation of the machinery only to the degree necessary to avoid hazard.

One suitable approach to such classification is to cluster individual occupied voxels into objects that can be analyzed at a higher level. To achieve this, the control system may implement any of several conventional, well-known clustering techniques such as Euclidean clustering, K-means clustering and Gibbs-sampling clustering. Any of these or similar algorithms can be used to identify clusters of occupied voxels from 3D point cloud data. Mesh techniques, which determine a mesh that best fits the point-cloud data and then use the mesh shape to determine optimal clustering, may also be used. Once identified, these clusters can be tracked over time by associating identified clusters in each image frame with nearby clusters in previous frames or using more sophisticated image-processing techniques. The shape, size, or other features of a cluster can be identified and tracked from one frame to the next. The configuration of the cluster and/or the manner in which the cluster moves from frame to frame can be key to its classification. These operations are, of course, computationally intensive.

Unknown objects entering from a known and defined entry point in a workspace require particular attention, as they could be humans. An observed feature originating at an entry point may be initially unclassified or unidentified. For example, a cluster of voxels recorded by one or more cameras may not be classifiable as a known object and may therefore represent an unrecognized physical item in the workspace or possibly a spurious accident of imaging. The decision whether to ignore or retain the cluster for further safeguarding against a hazard may depend not only on its size but its location or relationship to other features or objects. Observed features that would otherwise be ignored may be retained if they are located at or near a known entry point (particularly near the edge of an entry point) to a workcell, since these offer access to humans (or human appendages) and, as a result, there is a higher chance that the feature needs to be considered for safety purposes—possibly resulting in a precautionary shutdown or slowdown of machinery operation. A small cluster of voxels at an entry point could, for example, be the hand of a person, so it cannot be ignored since the entire spatial volume of the object or person is not visible to the cameras. Were a similar voxel cluster well within the workcell it could be safely ignored since its total volume could be confirmed to be smaller than minimum human size. Hence, the special features of entry points increase the computational load, complexity, and latency of the control system given the need to analyze all clusters appearing therein until they are classified or disappear—and the more entry points within a monitored space, the greater will be the impact on workcell productivity and the additional computational burden. Additionally, entry points must be sufficiently far away from the hazard that is being safeguarded, since the system must assume that a human is located just on the other side of the entry point, increasing the overall space that must be monitored—which may be unnecessary if the space between the hazard and the entry point is also monitored by another system.

SUMMARY

Embodiments of the invention implement one or more strategies to reduce the complexity and adverse productivity impacts of handling detected point clusters appearing at an entry point and requiring redundant coverage of adjacent space monitored by another system. In one strategy, if the other side of the entry point of a first workcell is a second, adjacent workcell, the monitoring system for the second workcell predicts when a human in that workcell may pass through the entry point to the first workcell and alerts the monitoring system for the first workcell. The prediction may be based on proximity of a human to the entry point or movement toward it. Proximity may be assessed in terms of absolute distance to the entry point or presence within a defined zone adjacent to the entry point.

A second strategy pertains to configurations in which workcells are merged or are too large for a single monitoring system to cover. The transition from the zone monitored by one system to that monitored by another is, in effect, an entry point extending along the entire boundary. Although zone coverage may overlap, the monitoring system configured specifically for a zone is best suited to monitoring that zone as entering point clusters are detected, and the departure (or likely departure) of a classified object from a first zone into an adjacent second zone can be sensed by the first zone's monitoring system and object information provided to the system responsible for monitoring the second zone.

Such handoff is not possible if the adjacent workcell or zone is not monitored—i.e., if the exit point or boundary leads to an unmonitored area that may still harbor hazards because, for example, human entry is not expected. In such cases, the control system for the monitored workcell may sense departure of a human through the exit point and thereupon cause dangerous machinery in the unmonitored region to be put in a safe state, e.g., by communicating directly with the controller of such machinery.

Accordingly, in a first aspect, the invention relates to a method of monitoring a portal between adjacent first and second three-dimensional workcells each of which includes controlled machinery; the portal is traversable by humans from either of the workcells into the other workcell, and at least the second workcell includes a monitoring system comprising a plurality of cameras distributed thereabout. In various embodiments, the method comprises the steps of computationally predicting that a human will cross the portal from the first workcell into the second workcell; and electronically signaling the monitoring system of the second workcell of expected entry of the identified first human into the second workcell. The monitoring system of the second workcell does not analyze detected features at the portal to determine whether they are associated with a human except following receipt of the signal indicating expected entry of a human into the second workcell through the portal.

In some embodiments, the method further comprises computationally identifying, by the monitoring system of the second workcell, a second human in the second workcell based on images of the second workcell recorded by at least one of the cameras therein; computationally predicting, based at least in part on the recorded images, that the identified second human will cross the portal into the first workcell; and electronically signaling, by the monitoring system of the second workcell, a monitoring system of the first workcell of expected entry of the identified second human into the first workcell. Neither of the monitoring systems analyzes detected features at the portal to determine whether they are associated with a human except following receipt of a signal from the other monitoring system indicating expected entry of a human through the portal.

Predicting that an identified human will cross the portal into an adjacent workcell may be based on proximity of the identified human to the portal and/or computationally projected motion of the identified human. The first and second workcells may or may not overlap.

In a second aspect, the invention pertains to a method of monitoring adjacent first and second three-dimensional workcells each of which includes controlled machinery. The first and second workcells overlap along a shared region, and at least the second workcell includes a monitoring system comprising plurality of cameras distributed thereabout. In various embodiments, the method comprises the steps of computationally predicting that a human will cross a first portal in the shared region into the second workcell and electronically signaling the monitoring system of the second workcell of expected crossing of the first portal by the identified first human. The second workcell does not analyze detected features in the shared region to determine whether they are associated with a human except following receipt of the signal indicating expected entry of a human into the second workcell through the portal.

In various embodiments, the method further comprises the steps of computationally identifying, by the monitoring system of the second workcell, a second human in the second workcell based on images of the second workcell recorded by at least one of the cameras therein; computationally predicting, based at least in part on the recorded images, that the identified second human will cross a second portal in the shared region; and electronically signaling, by the monitoring system of the second workcell, a monitoring system of the first workcell of expected crossing of the second portal by the identified second human. Neither of the monitoring systems analyzes detected features in the shared region to determine whether they are associated with a human except following receipt of a signal from the other monitoring system indicating expected entry of a human through a portal.

The first and second portals may, for example, be the same portal located within (e.g., midway within) the shared region. The first portal may be a boundary of the second workcell and the second portal is a boundary of the first workcell.

Predicting that an identified human will cross the portal into an adjacent workcell may be based on proximity of the identified human to the portal and/or computationally projected motion of the identified human.

In some embodiments, the method further comprises preventing crosstalk between cameras of the first and second workcells by causing otherwise interfering cameras to operate simultaneously in accordance with a noninterference scheme. For example, the noninterference scheme may comprise time-division multiplexing at least some interfering light sources and/or wavelength-division multiplexing at least some interfering light sources. In various embodiments, the cameras have light sources that emit radiation having a modulation frequency and the noninterference scheme comprises multiplexing the modulation frequencies of at least some interfering camera light sources. Alternatively, the noninterference scheme may involve a background interference map and the step of causing the cameras of the first and second workcells to operate simultaneously in accordance with the noninterference scheme may comprise subtracting background illumination specified in the map.

In still another aspect, the invention relates to a method of monitoring a portal between a monitored workcell and an unmonitored workcell including controlled machinery. The portal is traversable by humans from one of the workcells into the other workcell and the monitored workcell including a plurality of cameras distributed thereabout. In various embodiments, the method comprises the steps of computationally identifying, by a monitoring system of the monitored workcell, a human in the monitored workcell based on images recorded by at least one of the cameras therein; computationally predicting, based at least in part on the recorded images, that the identified human will cross the portal into the unmonitored workcell; and based on the computational prediction, electronically signaling a control system of the machinery the monitoring system to put the machinery into a safe state—e.g., shutting down the machinery.

Predicting that the identified human will cross the portal may be based on proximity of the identified human to the portal and/or computationally projected motion of the identified human.

In general, as used herein, the term "substantially" means±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

In the following discussion, we describe an integrated system for monitoring a workspace, classifying regions therein for safety purposes, and dynamically identifying safe states. In some cases the latter function involves semantic analysis of a robot in the workspace and identification of the workpieces with which it interacts. It should be understood, however, that these various elements may be implemented separately or together in desired combinations; the inventive aspects discussed herein do not require all of the described elements, which are set forth together merely for ease of presentation and to illustrate their interoperability. The system as described represents merely one embodiment.

1. Workcell Monitoring

Figure 1:
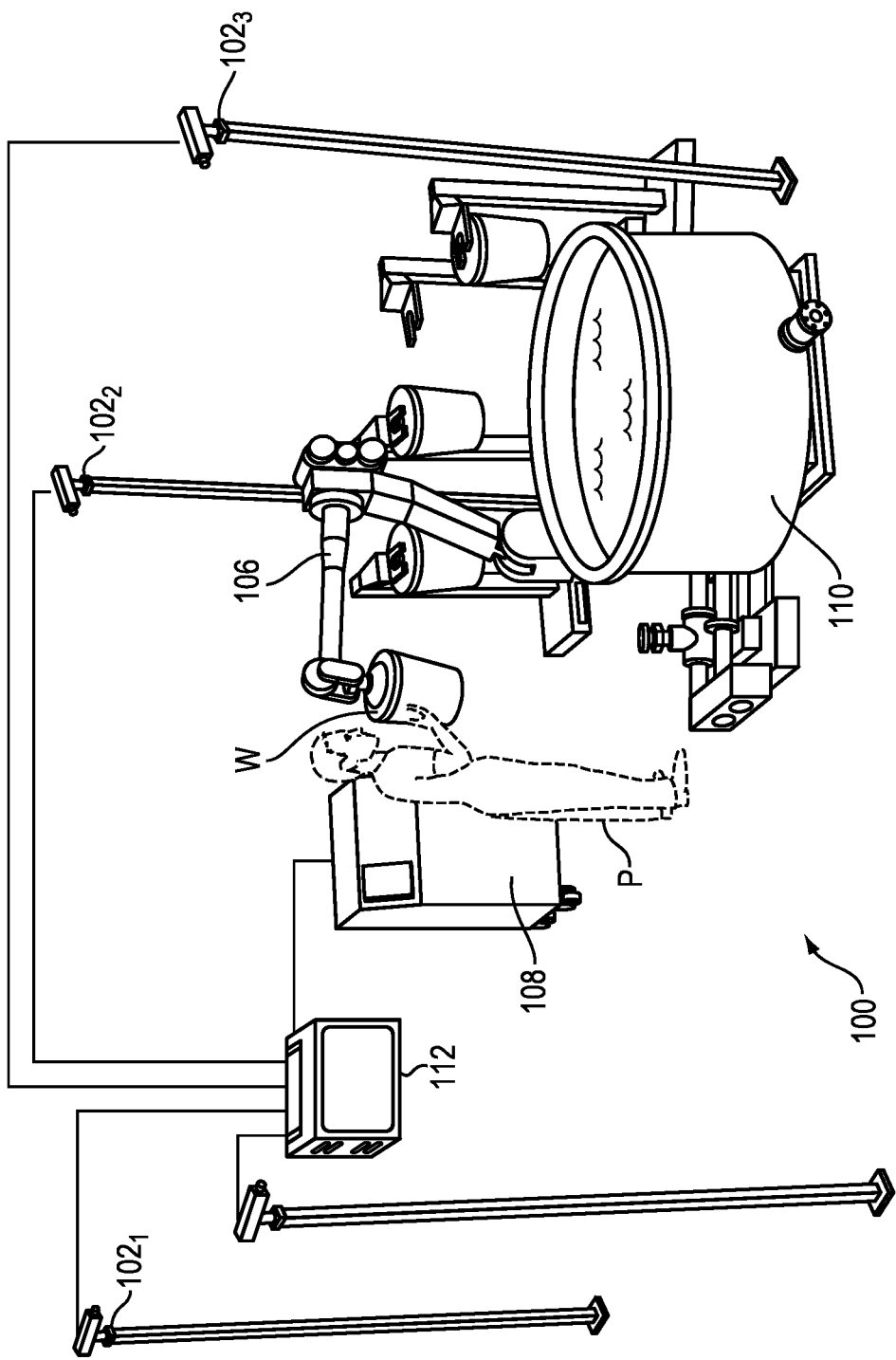
FIG. 1 is a perspective view of a monitored workspace in accordance with an embodiment of the invention.

Refer first to FIG. 1, which illustrates a representative 3D workcell 100 monitored by a plurality of cameras representatively indicated at 1021 and 1022. The cameras 102 may be conventional depth-sensing cameras, e.g., 3D time-of-flight cameras, stereo vision cameras, or 3D LIDAR cameras, ideally with high frame rates (e.g., between 30 Hz and 100 Hz). In general, as used herein, the term "sensor" refers to a device for sensing the amplitude of electromagnetic radiation, typically within a confined operating band of wavelengths. A "camera" includes a sensor and possibly, though not necessarily, a source of illumination, e.g., tuned to the working wavelength band of the associated sensor. Moreover, a camera may be 2D or 3D, e.g., 2D scanners and LIDAR systems are "cameras" for purposes hereof. "Light" refers to electromagnetic radiation of any wavelength that may be detected by a sensor as described herein.

The mode of operation of the cameras 102 is not critical so long as a 3D representation of the workcell 100 is obtainable from images or other data obtained by the cameras 102. As shown in the figure, cameras 102 collectively cover and can monitor the workcell 100, which includes a robot 106 controlled by a conventional robot controller 108. The robot interacts with various workpieces W, and a person P in the workcell 100 may interact with the workpieces and the robot 108. The workcell 100 may also contain various items of auxiliary equipment 110, which can complicate analysis of the workcell by occluding various portions thereof from the cameras. Indeed, any realistic arrangement of sensors will frequently be unable to "see" at least some portion of an active workcell. This is illustrated in the simplified arrangement of FIG. 1: due to the presence of the person P, at least some portion of robot controller 108 may be occluded from all cameras. In an environment that people traverse and where even stationary objects may be moved from time to time, the unobservable regions will shift and vary.

Figure 2:
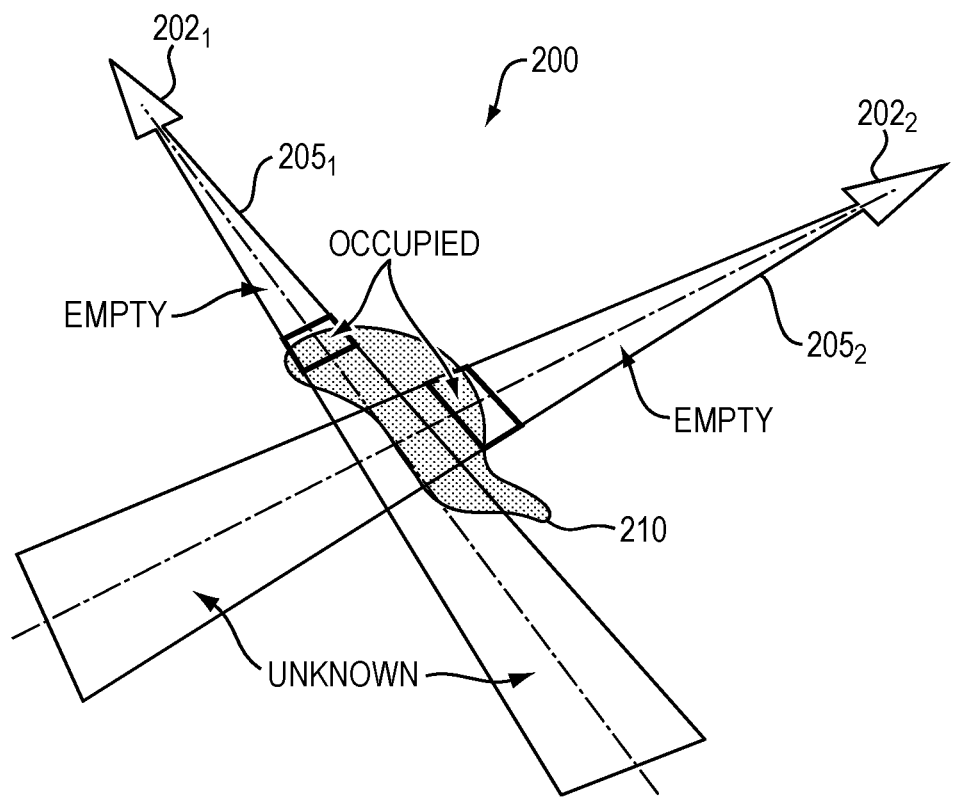
FIG. 2 schematically illustrates classification of regions within the monitored workspace in accordance with an embodiment of the invention.

As shown in FIG. 2, embodiments of the present invention classify workcell regions as occupied, unoccupied (or empty), or unknown. For ease of illustration, FIG. 2 shows two cameras 2021, 2022 and their zones of coverage 2051, 2052 within the workcell 200 in two dimensions; similarly, only the 2D footprint 210 of a 3D object is shown. The portions of the coverage zones 205 between the object boundary and the cameras 200 are marked as unoccupied, because each camera affirmatively detects no obstructions in this intervening space. The space at the object boundary is marked as occupied. In a coverage zone 205 beyond an object boundary, all space is marked as unknown; the corresponding camera is configured to sense occupancy in this region but, because of the intervening object 210, cannot do so.

With renewed reference to FIG. 1, data from each camera 102 is received by a control system 112. The volume of space covered by each camera—typically a solid cone—may be represented in any suitable fashion, e.g., the space may be divided into a 3D grid of small (5 cm, for example) cubes or "voxels" or other suitable form of volumetric representation. For example, workcell 100 may be represented using 2D or 3D ray tracing, where the intersections of the 2D or 3D rays emanating from the cameras 102 are used as the volume coordinates of the workcell 100. This ray tracing can be performed dynamically or via the use of precomputed volumes, where objects in the workcell 100 are previously identified and captured by control system 112. For convenience of presentation, the ensuing discussion assumes a voxel representation; control system 112 maintains an internal representation of the workcell 100 at the voxel level, with voxels marked as occupied, unoccupied, or unknown.

Figure 3:
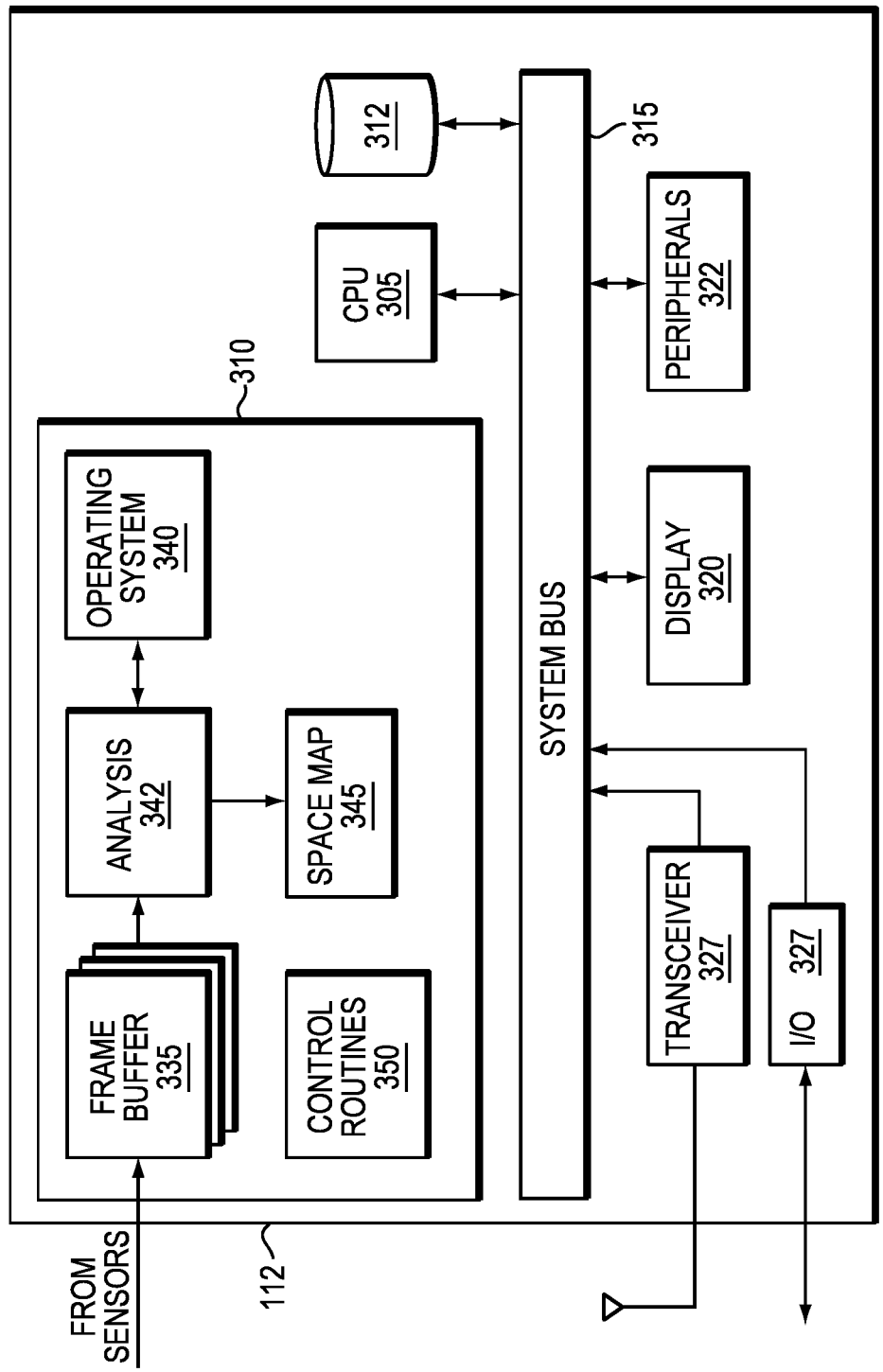
FIG. 3 schematically illustrates a control system in accordance with an embodiment of the invention.

FIG. 3 illustrates, in greater detail, a representative embodiment of control system 112, which may be implemented on a general-purpose computer. The control system 112 includes a central processing unit (CPU) 305, system memory 310, and one or more non-volatile mass storage devices (such as one or more hard disks and/or optical storage units) 312. The system 112 further includes a bidirectional system bus 315 over which the CPU 305, memory 310, and storage device 312 communicate with each other as well as with internal or external input/output (I/O) devices such as a display 320 and peripherals 322, which may include traditional input devices such as a keyboard or a mouse). The control system 112 also includes a wireless transceiver 325 and one or more I/O ports 327. Transceiver 325 and I/O ports 327 may provide a network interface. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter; for example, a supervisor may establish communication with control system 112 using a tablet that wirelessly joins the network. When used in a WAN networking environment, computers typically include a modem or other communication mechanism. Modems may be internal or external and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), Bluetooth, ZigBee, IrDa, near-field communication (NFC), or other suitable protocol. Furthermore, components of the system may communicate through a combination of wired or wireless paths, and communication may involve both computer and telecommunications networks.

CPU 305 is typically a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

The system memory 310 contains a series of frame buffers 335, i.e., partitions that store, in digital form (e.g., as pixels or voxels, or as depth maps), images obtained by the cameras 102; the data may actually arrive via I/O ports 327 and/or transceiver 325 as discussed above. System memory 310 contains instructions, conceptually illustrated as a group of modules, that control the operation of CPU 305 and its interaction with the other hardware components. An operating system 340 (e.g., Windows or Linux) directs the execution of low-level, basic system functions such as memory allocation, file management and operation of mass storage device 312. At a higher level, and as described in greater detail below, an analysis module 342 registers the images in frame buffers 335 and analyzes them to classify regions of the monitored workcell 100. The result of the classification may be stored in a space map 345, which contains a volumetric representation of the workcell 100 with each voxel (or other unit of representation) labeled, within the space map, as described herein. Alternatively, space map 345 may simply be a 3D array of voxels, with voxel labels being stored in a separate database (in memory 310 or in mass storage 312).

Control system 112 may also control the operation or machinery in the workcell 100 using conventional control routines collectively indicated at 350. As explained below, the configuration of the workcell and, consequently, the classifications associated with its voxel representation may well change over time as persons and/or machines move about, and control routines 350 may be responsive to these changes in operating machinery to achieve high levels of safety. All of the modules in system memory 310 may be programmed in any suitable programming language, including, without limitation, high-level languages such as C, C++, C#, Ada, Basic, Cobra, Fortran, Java, Lisp, Perl, Python, Ruby, or low-level assembly languages.

1.1 Camera Registration

In a typical multi-camera system, the precise location of each camera 102 with respect to all other cameras is established during setup. Camera registration is usually performed automatically and should be as simple as possible to allow for ease of setup and reconfiguration. Assuming for simplicity that each frame buffer 335 stores an image (which may be refreshed periodically) from a particular camera 102, analysis module 342 may register cameras 102 by comparing all or part of the image from each camera to the images from other cameras in frame buffers 335, and using conventional computer-vision techniques to identify correspondences in those images. Suitable global-registration algorithms, which do not require an initial registration approximation, generally fall into two categories: feature-based methods and intensity-based methods. Feature-based methods identify correspondences between image features such as edges while intensity-based methods use correlation metrics between intensity patterns. Once an approximate registration is identified, an Iterative Closest Point (ICP) algorithm or suitable variant thereof may be used to fine-tune the registration.

If there is sufficient overlap between the fields of view of the various cameras 102, and sufficient detail in the workcell 100 to provide distinct camera images, it may be sufficient to compare images of the static workcell. If this is not the case, a "registration object" having a distinctive signature in 3D can be placed in a location within workcell 100 where it can be seen by all cameras. Alternatively, registration can be achieved by having the cameras 102 record images of one or more people standing in the workcell or walking throughout the workcell over a period of time, combining a sufficient number of partially matching images until accurate registration is achieved.

Registration to machinery within the workcell 100 can, in some cases, be achieved without any additional instrumentation, especially if the machinery has a distinctive 3D shape (for example, a robot arm), so long as the machinery is visible to at least one camera registered with respect to the others. Alternatively, a registration object can be used, or a user interface, shown in display 320 and displaying the scene observed by the cameras, may allow a user to designate certain parts of the image as key elements of the machinery under control. In some embodiments, the interface provides an interactive 3D display that shows the coverage of all cameras to aid in configuration. If the system is be configured with some degree of high-level information about the machinery being controlled (for purposes of control routines 350, for example)—such as the location(s) of dangerous part or parts of the machinery and the stopping time and/or distance—analysis module 342 may be configured to provide intelligent feedback as to whether the cameras are providing sufficient coverage, and suggest placement for additional cameras.

For example, analysis module 342 can be programmed to determine the minimum distance from the observed machinery at which it must detect a person in order to stop the machinery by the time the person reaches it (or a safety zone around it), given conservative estimates of walking speed. (Alternatively, the required detection distance can be input directly into the system via display 320.) Optionally, analysis module 342 can then analyze the fields of view of all cameras to determine whether the space is sufficiently covered to detect all approaches. If the camera coverage is insufficient, analysis module 342 can propose new locations for existing cameras, or locations for additional cameras, that would remedy the deficiency. Otherwise, the control system will default to a safe state and control routines 350 will not permit machinery to operate unless analysis module 342 verifies that all approaches can be monitored effectively. Use of machine learning and genetic or evolutionary algorithms can be used to determine optimal camera placement within a cell. Parameters to optimize include but are not limited to minimizing occlusions around the robot during operation and observability of the robot and workpieces.

If desired, this static analysis may include "background" subtraction. During an initial startup period, when it may be safely assumed there are no objects intruding into the workcell 100, analysis module 342 identifies all voxels occupied by the static elements. Those elements can then be subtracted from future measurements and not considered as potential intruding objects. Nonetheless, continuous monitoring is performed to ensure that the observed background image is consistent with the space map 345 stored during the startup period. Background can also be updated if stationary objects are removed or are added to the workcell There may be some areas that cameras 102 cannot observe sufficiently to provide safety, but that are guarded by other methods such as cages, etc. In this case, the user interface can allow the user to designate these areas as safe, overriding the camera-based safety analysis. Safety-rated soft-axis and rate limitations can also be used to limit the envelope of the robot to improve performance of the system.

Once registration has been achieved, cameras 102 should remain in the same location and orientation while the workcell 100 is monitored. If one or more cameras 102 are accidentally moved, the resulting control outputs will be invalid and could result in a safety hazard. Analysis module 342 may extend the algorithms used for initial registration to monitor continued accuracy of registration. For example, during initial registration analysis module 342 may compute a metric capturing the accuracy of fit of the observed data to a model of the work cell static elements that is captured during the registration process. As the system operates, the same metric can be recalculated. If at any time that metric exceeds a specified threshold, the registration is considered to be invalid and an error condition is triggered; in response, if any machinery is operating, a control routine 350 may halt it or transition the machinery to a safe state.

1.2 Identifying Occupied and Potentially Occupied Areas

Once the cameras have been registered, control system 112 periodically updates space map 345—at a high fixed frequency (e.g., every analysis cycle) in order to be able to identify all intrusions into workcell 100. Space map 345 reflects a fusion of data from some or all of the cameras 102. But given the nature of 3D data, depending on the locations of the cameras 102 and the configuration of workcell 100, it is possible that an object in one location will occlude the camera's view of objects in other locations, including objects (which may include people or parts of people, e.g. arms) that are closer to the dangerous machinery than the occluding object. Therefore, to provide a reliably safe system, the system monitors occluded space as well as occupied space.

In one embodiment, space map 345 is a voxel grid. In general, each voxel may be marked as occupied, unoccupied or unknown; only empty space can ultimately be considered safe, and only when any additional safety criteria—e.g., minimum distance from a piece of controlled machinery—is satisfied. Raw data from each sensor is analyzed to determine whether, for each voxel, an object or boundary of the 3D mapped space has been definitively detected in the volume corresponding to that voxel. To enhance safety, analysis module 342 may designate as empty only voxels that are observed to be empty by more than one camera 102. Again, all space that cannot be confirmed as empty is marked as unknown. Thus, only space between a camera 102 and a detected object or mapped 3D space boundary along a ray may be marked as empty.

If a sensor detects anything in a given voxel, all voxels that lie on the ray beginning at the focal point of that sensor and passing through the occupied voxel, and which are between the focal point and the occupied voxel, are classified as unoccupied, while all voxels that lie beyond the occupied voxel on that ray are classified as occluded for that sensor; all such occluded voxels are considered "unknown." Information from all sensors may be combined to determine which areas are occluded from all sensors; these areas are considered unknown and therefore unsafe. Analysis module 342 may finally mark as "unoccupied" only voxels or workcell volumes that have been preliminarily marked at least once (or, in some embodiments, at least twice) as "unoccupied." Based on the markings associated with the voxels or discrete volumes within the workcell, analysis module 342 may map one or more safe volumetric zones within space map 345. These safe zones are outside a safety zone of the machinery and include only voxels or workcell volumes marked as unoccupied.

A common failure mode of active optical sensors that depend on reflection, such as those used in LIDAR and time-of-flight cameras, is that they do not return any signal from surfaces that are insufficiently reflective, and/or when the angle of incidence between the sensor and the surface is too shallow. This can lead to a dangerous failure because this signal can be indistinguishable from the result that is returned if no obstacle is encountered; the sensor, in other words, will report an empty voxel despite the possible presence of an obstacle. This is why ISO standards for e.g. 2D LIDAR cameras have specifications for the minimum reflectivity of objects that must be detected; however, these reflectivity standards can be difficult to meet for some 3D camera modalities such as time of flight (ToF). In order to mitigate this failure mode, analysis module 342 marks space as empty only if some obstacle is definitively detected at further range along the same ray. By pointing cameras slightly downward so that most of the rays will encounter the floor if no obstacles are present, it is possible to conclusively analyze most of the workcell 100. But if the sensed light level in a given voxel is insufficient to definitively establish emptiness or the presence of a boundary, the voxel is marked as unknown. The signal and threshold value may depend on the type of sensor being used. In the case of an intensity-based 3D sensor (for example, a ToF camera) the threshold value can be a signal intensity, which may be attenuated by objects in the workcell of low reflectivity. In the case of a stereo vision system, the threshold may be the ability to resolve individual objects in the field of view. Other signal and threshold value combinations can be utilized depending on the type of sensor used.

A safe system can be created by treating all unknown space as though it were occupied. However, in some cases this may be overly conservative and result in poor performance. It is therefore desirable to further classify unknown space according to whether it could potentially be occupied. As a person moves within a 3D space, he or she will typically occlude some areas from some sensors, resulting in areas of space that are temporarily unknown (see FIG. 1). Additionally, moving machinery such as an industrial robot arm can also temporarily occlude some areas. When the person or machinery moves to a different location, one or more sensors will once again be able to observe the unknown space and return it to the confirmed-empty state in which it is safe for the robot or machine to operate. Accordingly, in some embodiments, space may also be classified as "potentially occupied." Unknown space is considered potentially occupied when a condition arises where unknown space could be occupied. This could occur when unknown space is adjacent to entry points to the workcell or if unknown space is adjacent to occupied or potentially occupied space. The potentially occupied space "infects" unknown space at a rate that is representative of a human moving through the workcell. Potentially occupied space stays potentially occupied until it is observed to be empty. For safety purposes, potentially occupied space is treated the same as occupied space. It may be desirable to use probabilistic techniques such as those based on Bayesian filtering to determine the state of each voxel, allowing the system to combine data from multiple samples to provide higher levels of confidence in the results. Suitable models of human movement, including predicted speeds (e.g., an arm may be raised faster than a person can walk), are readily available.

2. Classifying Objects

For many applications, the classification of regions in a workcell as described above may be sufficient—e.g., if control system 112 is monitoring space in which there should be no objects at all during normal operation. In many cases, however, it is desirable to monitor an area in which there are at least some objects during normal operation, such as one or more machines and workpieces on which the machine is operating. In these cases, analysis module 342 may be configured to identify intruding objects that are unexpected or that may be humans. One suitable approach to such classification is to cluster individual occupied voxels into objects that can be analyzed at a higher level.

To achieve this, analysis module 342 may implement any of several conventional, well-known clustering techniques such as Euclidean clustering, K-means clustering and Gibbs-sampling clustering. Any of these or similar algorithms can be used to identify clusters of occupied voxels from 3D point cloud data. Mesh techniques, which determine a mesh that best fits the point-cloud data and then use the mesh shape to determine optimal clustering, may also be used. Once identified, these clusters can be useful in various ways.

One simple way clustering can be used is to eliminate small groups of occupied or potentially occupied voxels that are too small to possibly contain a person. Such small clusters may arise from occupation and occlusion analysis, as described above, and can otherwise cause control system 112 to incorrectly identify a hazard. Clusters can be tracked over time by simply associating identified clusters in each image frame with nearby clusters in previous frames or using more sophisticated image-processing techniques. The shape, size, or other features of a cluster can be identified and tracked from one frame to the next. Such features can be used to confirm associations between clusters from frame to frame, or to identify the motion of a cluster. This information can be used to enhance or enable some of the classification techniques described below. Additionally, tracking clusters of points can be employed to identify incorrect and thus potentially hazardous situations. For example, a cluster that was not present in previous frames and is not close to a known border of the field of view may indicate an error condition.

In some cases, it may be sufficient to filter out clusters below a certain size and to identify cluster transitions that indicate error states. In other cases, however, it may be necessary to further classify objects into one or more of four categories: (1) elements of the machinery being controlled by system 112, (2) the workpiece or workpieces that the machinery is operating on, and (3) other foreign objects, including people, that may be moving in unpredictable ways and that can be harmed by the machinery. It may or may not be necessary to conclusively classify people versus other unknown foreign objects. It may be necessary to definitively identify elements of the machinery as such, because by definition these will always be in a state of "collision" with the machinery itself and thus will cause the system to erroneously stop the machinery if detected and not properly classified. Similarly, machinery typically comes into contact with workpieces, but it is typically hazardous for machinery to come into contact with people. Therefore, analysis module 342 should be able to distinguish between workpieces and unknown foreign objects, especially people.

Elements of the machinery itself may be handled for classification purposes by the optional background-subtraction calibration step described above. In cases where the machinery changes shape, elements of the machinery can be identified and classified, e.g., by supplying analysis module 342 with information about these elements (e.g., as scalable 3D representations), and in some cases (such as industrial robot arms) providing a source of instantaneous information about the state of the machinery. Analysis module 342 may be "trained" by operating machinery, conveyors, etc. in isolation under observation by the cameras 102, allowing analysis module 342 to learn their precise regions of operation resulting from execution of the full repertoire of motions and poses. Analysis module 342 may classify the resulting spatial regions as occupied.

Conventional computer-vision techniques may be employed to enable analysis module 342 to distinguish between workpieces and humans. These include deep learning, a branch of machine learning designed to use higher levels of abstraction in data. The most successful of these deep-learning algorithms have been convolutional neural networks (CNNs) and more recently recurrent neural networks (RNNs). However, such techniques are generally employed in situations where accidental misidentification of a human as a non-human does not cause safety hazards. In order to use such techniques in the present environment, a number of modifications may be needed. First, machine-learning algorithms can generally be tuned to prefer false positives or false negatives (for example, logistic regression can be tuned for high specificity and low sensitivity). False positives in this scenario do not create a safety hazard—if the robot mistakes a workpiece for a human, it will react conservatively. Additionally, multiple algorithms or neural networks based on different image properties can be used, promoting the diversity that may be key to achieving sufficient reliability for safety ratings. One particularly valuable source of diversity can be obtained by using cameras that provide both 3D and 2D image data of the same object. If any one technique identifies an object as human, the object will be treated as human. Using multiple techniques or machine-learning algorithms, all tuned to favor false positives over false negatives, sufficient reliability can be achieved. In addition, multiple images can be tracked over time, further enhancing reliability—and again every object can be treated as human until enough identifications have characterized it as non-human to achieve reliability metrics. Essentially, this diverse algorithmic approach, rather than identifying humans, identifies things that are definitely not humans.

In addition to combining classification techniques, it is possible to identify workpieces in ways that do not rely on any type of human classification at all. One approach is to configure the system by providing models of workpieces. For example, a "teaching" step in system configuration may simply supply images or key features of a workpiece to analysis module 342, which searches for matching configurations in space map 345, or may instead involving training of a neural network to automatically classify workpieces as such in the space map. In either case, only objects that accurately match the stored model are treated as workpieces, while all other objects are treated as humans.

Another suitable approach is to specify particular regions within the workcell, as represented in the space map 345, where workpieces will enter (such as the top of a conveyor belt). Only objects that enter the workcell in that location are eligible for treatment as workpieces. The workpieces can then be modeled and tracked from the time they enter the workcell until the time they leave. While a monitored machine such as a robot is handling a workpiece, control system 112 ensures that the workpiece is moving only in a manner consistent with the expected motion of the robot end effector. Known equipment such as conveyor belts can also be modeled in this manner. Humans may be forbidden from entering the work cell in the manner of a workpiece—e.g., sitting on conveyors.

All of these techniques can be used separately or in combination, depending on design requirements and environmental constraints. In all cases, however, there may be situations where analysis module 342 loses track of whether an identified object is a workpiece. In these situations the system should fall back to a safe state. An interlock can then be placed in a safe area of the workcell where a human worker can confirm that no foreign objects are present, allowing the system to resume operation.

In some situations, a foreign object enters the workcell, but subsequently should be ignored or treated as a workpiece. For example, a stack of boxes that was not present in the workcell at configuration time may subsequently be placed therein. This type of situation, which will become more common as flexible systems replace fixed guarding, may be addressed by providing a user interface (e.g., shown in display 320 or on a device in wireless communication with control system 112) that allows a human worker to designate the new object as safe for future interaction. Of course, analysis module 342 and control routines 350 may still act to prevent the machinery from colliding with the new object, but the new object will not be treated as a potentially human object that could move towards the machinery, thus allowing the system to handle it in a less conservative manner.

3. Generating Control Outputs

At this stage, analysis module 342 has identified all objects in the monitored area 100 that must be considered for safety purposes. Given these data, a variety of actions can be taken and control outputs generated. During static calibration or with the workcell in a default configuration free of humans, space map 345 may be useful to a human for evaluating camera coverage, the configuration of deployed machinery, and opportunities for unwanted interaction between humans and machines. Even without setting up cages or fixed guards, the overall workcell layout may be improved by channeling or encouraging human movement through the regions marked as safe zones, as described above, and away from regions with poor camera coverage.

Control routines 350, responsive to analysis module 342, may generate control signals to operating machinery, such as robots, within workcell 100 when certain conditions are detected. This control can be binary, indicating either safe or unsafe conditions, or can be more complex, such as an indication of what actions are safe and unsafe. The simplest type of control signal is a binary signal indicating whether an intrusion of either occupied or potentially occupied volume is detected in a particular zone. In the simplest case, there is a single intrusion zone and control system 112 provides a single output indicative of an intrusion. This output can be delivered, for example, via an I/O port 327 to a complementary port on the controlled machinery to stop or limit the operation of the machinery. In more complex scenarios, multiple zones are monitored separately, and a control routine 350 issues a digital output via an I/O port 327 or transceiver 325 addressed, over a network, to a target piece of machinery (e.g., using the Internet protocol or other suitable addressing scheme).

Another condition that may be monitored is the distance between any object in the workcell and a machine, comparable to the output of a 2D proximity sensor. This may be converted into a binary output by establishing a proximity threshold below which the output should be asserted. It may also be desirable for the system to record and make available the location and extent of the object closest to the machine. In other applications, such as a safety system for a collaborative industrial robot, the desired control output may include the location, shape, and extent of all objects observed within the area covered by the cameras 102.

4. Safe Action Constraints and Dynamic Determination of Safe Zones

ISO 10218 and ISO/TS 15066 describe speed and separation monitoring as a safety function that can enable collaboration between an industrial robot and a human worker. Risk reduction is achieved by maintaining at least a protective separation distance between the human worker and robot during periods of robot motion. This protective separation distance is calculated using information including robot and human worker position and movement, robot stopping distance, measurement uncertainty, system latency and system control frequency. When the calculated separation distance decreases to a value below the protective separation distance, the robot system is stopped. This methodology can be generalized beyond industrial robotics to machinery.

For convenience, the following discussion focuses on dynamically defining a safe zone around a robot operating in the workcell 100. It should be understood, however, that the techniques described herein apply not only to multiple robots but to any form of machinery that can be dangerous when approached too closely, and which has a minimum safe separation distance that may vary over time and with particular activities undertaken by the machine. As described above, a camera array obtains sufficient image information to characterize, in 3D, the robot and the location and extent of all relevant objects in the area surrounding the robot at each analysis cycle. (Each analysis cycle includes image capture, refresh of the frame buffers, and computational analysis; accordingly, although the period of the analysis or control cycle is short enough for effective monitoring to occur in real time, it involves many computer clock cycles.) Analysis module 342 utilizes this information along with instantaneous information about the current state of the robot at each cycle to determine instantaneous, current safe action constraints for the robot's motion. The constraints may be communicated to the robot, either directly by analysis module 342 or via a control routine 350, to the robot via transceiver 325 or and I/O port 327.

Figure 4:
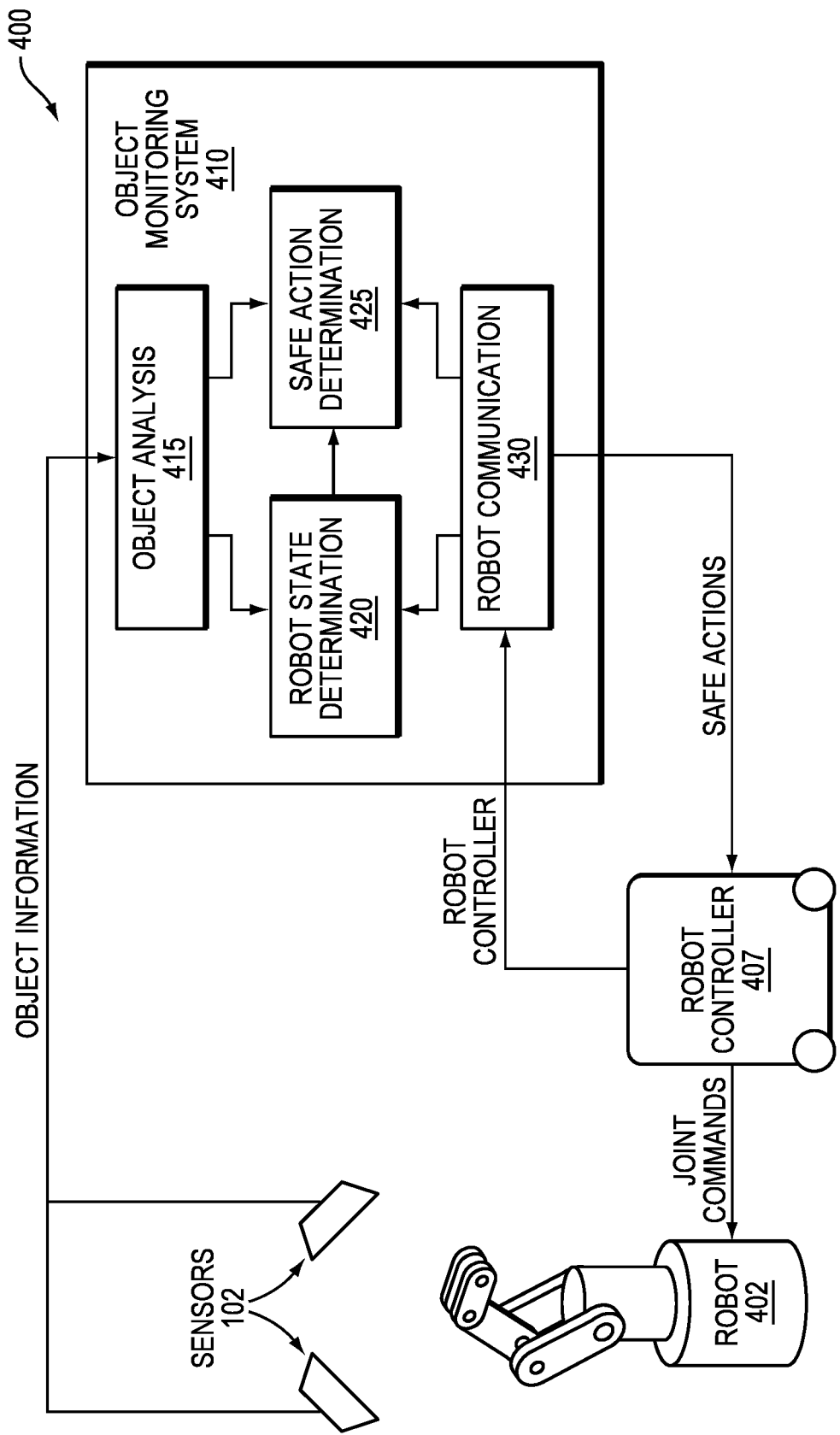
FIG. 4 schematically illustrates an object-monitoring system in accordance with an embodiment of the invention.

The operation of the system is best understood with reference to the conceptual illustration of system organization and operation of FIG. 4. As described above, a camera array 102 monitors the workcell 400, which includes a robot 402. The robot's movements are controlled by a conventional robot controller 407, which may be part of or separate from the robot itself; for example, a single robot controller may issue commands to more than one robot. The robot's activities may primarily involve a robot arm, the movements of which are orchestrated by robot controller 407 using joint commands that operate the robot arm joints to effect a desired movement. An object-monitoring system (OMS) 410 obtains information about objects from the cameras 102 and uses this sensor information to identify relevant objects in the workcell 400. OMS 410 communicates with robot controller 407 via any suitable wired or wireless protocol. (In an industrial robot, control electronics typically reside in an external control box. However, in the case of a robot with a built-in controller, OMS 410 communicates directly with the robot's onboard controller.) Using information obtained from the robot (and, typically, cameras 102), OMS 410 determines the robot's current state. OMS 410 thereupon determines safe-action constraints for robot 402 given the robot's current state and all identified relevant objects. Finally, OMS 410 communicates the safe action constraints to robot 407. (It will be appreciated that, with reference to FIG. 3, the functions of OMS 410 are performed in a control system 112 by analysis module 342 and, in some cases, a control routine 350.)

4.1 Identifying Relevant Objects

The cameras 102 provide real-time image information that is analyzed by an object-analysis module 415 at a fixed frequency in the manner discussed above; in particular, at each cycle, object analysis module 415 identifies the 3D location and extent of all objects in workcell 400 that are either within the robot's reach or that could move into the robot's reach at conservative expected velocities. If not all of the relevant volume is within the collective field of view of the cameras 102, OMS 410 may be configured to so determine and indicate the location and extent of all fixed objects within that region (or a conservative superset of those objects) and/or verify that other guarding techniques have been used to prevent access to unmonitored areas.

4.2 Determining Robot State

A robot state determination module (RSDM) 420 is responsive to data from cameras 102 and signals from the robot 402 and/or robot controller 407 to determine the instantaneous state of the robot. In particular, RSDM 420 determines the pose and location of robot 402 within workcell 400; this may be achieved using cameras 102, signals from the robot and/or its controller, or data from some combination of these sources. RSDM 420 may also determine the instantaneous velocity of robot 402 or any appendage thereof; in addition, knowledge of the robot's instantaneous joint accelerations or torques, or planned future trajectory may be needed in order to determine safe motion constraints for the subsequent cycle as described below. Typically, this information comes from robot controller 407, but in some cases may be inferred directly from images recorded by cameras 102 as described below.

For example, these data could be provided by the robot 402 or the robot controller 407 via a safety-rated communication protocol providing access to safety-rated data. The 3D pose of the robot may then be determined by combining provided joint positions with a static 3D model of each link to obtain the 3D shape of the entire robot 402.

In some cases, the robot may provide an interface to communicate joint positions that is not safety-rated, in which case the joint positions can be verified against images from cameras 102 (using, for example, safety-rated software). For example, received joint positions may be combined with static 3D models of each link to generate a 3D model of the entire robot 402. This 3D image can be used to remove any objects in the sensing data that are part of the robot itself. If the joint positions are correct, this will fully eliminate all object data attributed to the robot 402. If, however, the joint positions are incorrect, the true position of robot 402 will diverge from the model. In the previous cycle, it can be assumed that the joint positions were correct because otherwise robot 402 would have been halted. The detection of an incorrect reported robot position can then be used to trigger an error condition, which will cause control system 112 (see FIG. 1) to transition robot 402 to a safe state. Sensor data can be used to identify the position of the robot using a correlation algorithm, such as described above in the section on registration, and this detected position can be compared with the joint position reported by the robot. If the joint position information provided by robot 402 has been validated in this manner, it can be used to validate joint velocity information, which can then be used to predict future joint positions. If these positions are inconsistent with previously validated actual joint positions, the program can similarly trigger an error condition. These techniques enable use of a non-safety-rated interface to produce data that can then be used to perform additional safety functions.

Finally, RSDM 420 may be configured to determine the robot's joint state using only image information provided by cameras 102, without any information provided by robot 402 or controller 407. Given a model of all of the links in the robot, any of several conventional, well-known computer vision techniques can be used by RSDM 420 to register the model to sensor data, thus determining the location of the modeled object in the image. For example, the ICP algorithm (discussed above) minimizes the difference between two 3D point clouds. ICP often provides a locally optimal solution efficiently, and thus can be used accurately if the approximate location is already known. This will be the case if the algorithm is run every cycle, since robot 402 cannot have moved far from its previous position. Accordingly, globally optimal registration techniques, which may not be efficient enough to run in real time, are not required. Digital filters such as Kalman filters or particle filters can then be used to determine instantaneous joint velocities given the joint positions identified by the registration algorithm.

These image-based monitoring techniques often rely on being run at each system cycle, and on the assumption that the system was in a safe state at the previous cycle. Therefore, a test may be executed when robot 402 is started—for example, confirming that the robot is in a known, preconfigured "home" position and that all joint velocities are zero. It is common for automated equipment to have a set of tests that are executed by an operator at a fixed interval, for example, when the equipment is started up or on shift changes. Reliable state analysis typically requires an accurate model of each robot link. This model can be obtained a priori, e.g. from 3D CAD files provided by the robot manufacturer or generated by industrial engineers for a specific project. However, such models may not be available, at least not for the robot and all of the possible attachments it may have.

In this case, it is possible for RSDM 420 to create the model itself, e.g., using cameras 102. This may be done in a separate training mode where robot 402 runs through a set of motions, e.g., the motions that are intended for use in the given application and/or a set of motions designed to provide cameras 102 with appropriate views of each link. It is possible, but not necessary, to provide some basic information about the robot a priori, such as the lengths and rotational axes of each link. During this training mode, RSDM 420 generates a 3D model of each link, complete with all necessary attachments. This model can then be used by RSDM 420 in conjunction with sensor images to determine the robot state.

4.3 Determining Safe-Action Constraints

In traditional axis- and rate-limitation applications, an industrial engineer calculates what actions are safe for a robot, given the planned trajectory of the robot and the layout of the workcell—forbidding some areas of the robot's range of motion altogether and limiting speed in other areas. These limits assume a fixed, static workplace environment. Here we are concerned with dynamic environments in which objects and people come, go, and change position; hence, safe actions are calculated by a safe-action determination module (SADM) 425 in real time based on all sensed relevant objects and on the current state of robot 402, and these safe actions may be updated each cycle. In order to be considered safe, actions should ensure that robot 402 does not collide with any stationary object, and also that robot 402 does not come into contact with a person who may be moving toward the robot. Since robot 402 has some maximum possible deceleration, controller 407 should be instructed to begin slowing the robot down sufficiently in advance to ensure that it can reach a complete stop before contact is made.

Figure 5:
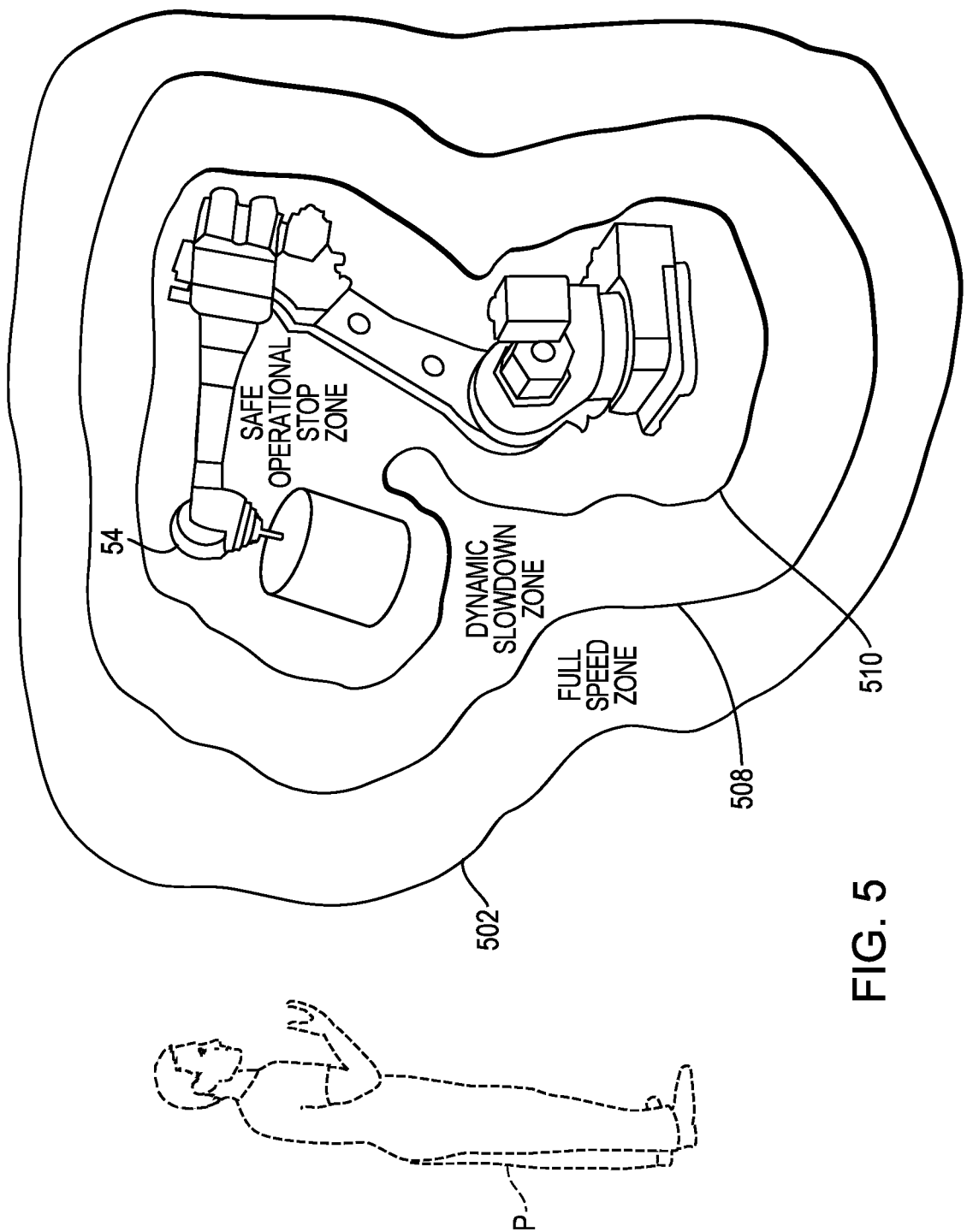
FIG. 5 schematically illustrates the definition of progressive safety envelopes in proximity to a piece of industrial machinery.

One approach to achieving this is to modulate the robot's maximum velocity (by which is meant the velocity of the robot itself or any appendage thereof) proportionally to the minimum distance between any point on the robot and any point in the relevant set of sensed objects to be avoided. The robot is allowed to operate at maximum speed when the closest object is further away than some threshold distance beyond which collisions are not a concern, and the robot is halted altogether if an object is within a certain minimum distance. Sufficient margin can be added to the specified distances to account for movement of relevant objects or humans toward the robot at some maximum realistic velocity. This is illustrated in FIG. 5. An outer envelope or 3D zone 502 is generated computationally by SADM 425 around the robot 504. Outside this zone 502, all movements of the person P are considered safe because, within an operational cycle, they cannot bring the person sufficiently close to the robot 504 to pose a danger. Detection of any portion of the person P's body within a second 3D zone 508, computationally defined within zone 502, is registered by SADM 425 but robot 504 is allowed to continue operating at full speed. If any portion of the person P crosses the threshold of zone 508 but is still outside an interior danger zone 510, robot 504 is signaled to operate at a slower speed. If any portion of the person P crosses into the danger zone 510 or is predicted to do so within the next cycle based on a model of human movement operation of robot 504 is halted. These zones may be updated if robot 504 is moved (or moves) within the environment.

A refinement of this technique is for SADM 425 to control maximum velocity proportionally to the square root of the minimum distance, which reflects the fact that in a constant-deceleration scenario, velocity changes proportionally to the square root of the distance traveled, resulting in a smoother and more efficient, but still equally safe, result. A further refinement is for SADM 425 to modulate maximum velocity proportionally to the minimum possible time to collision—that is, to project the robot's current state forward in time, project the intrusions toward the robot trajectory, and identify the nearest potential collision. This refinement has the advantage that the robot will move more quickly away from an obstacle than toward it, which maximizes throughput while still correctly preserving safety. Since the robot's future trajectory depends not just on its current velocity but on subsequent commands, SADM 425 may consider all points reachable by robot 402 within a certain reaction time given its current joint positions and velocities, and cause control signals to be issued based on the minimum collision time among any of these states. Yet a further refinement is for SADM 425 to take into account the entire planned trajectory of the robot when making this calculation, rather than simply the instantaneous joint velocities. Additionally, SADM 425 may, via robot controller 407, alter the robot's trajectory, rather than simply alter the maximum speed along that trajectory. It is possible to choose from among a fixed set of trajectories one that reduces or eliminates potential collisions, or even to generate a new trajectory on the fly.

While not necessarily a safety violation, collisions with static elements of the workcell are generally not desirable. The set of relevant objects can include all objects in the workspace, including both static background such as walls and tables, and moving objects such as workpieces and human workers. Either from prior configuration or run-time detection, cameras 102 and analysis module 342 may be able to infer which objects could possibly be moving. In this case, any of the algorithms described above can be refined to leave additional margins to account for objects that might be moving, but to eliminate those margins for objects that are known to be static, so as not to reduce throughput unnecessarily but still automatically eliminate the possibility of collisions with static parts of the work cell.

Beyond simply leaving margins to account for the maximum velocity of potentially moving objects, state estimation techniques based on information detected by the sensing system can be used to project the movements of humans and other objects forward in time, thus expanding the control options available to control routines 350. For example, skeletal tracking techniques can be used to identify moving limbs of humans that have been detected and limit potential collisions based on properties of the human body and estimated movements of, e.g., a person's arm rather than the entire person.

4.4 Communicating Safe Action Constraints to the Robot

The safe-action constraints identified by SADM 425 may be communicated by OMS 410 to robot controller 407 on each cycle via a robot communication module 430. As described above, communication module may correspond to an I/O port 327 interface to a complementary port on robot controller 407 or may correspond to transceiver 325. Most industrial robots provide a variety of interfaces for use with external devices. A suitable interface should operate with low latency at least at the control frequency of the system. The interface can be configured to allow the robot to be programmed and run as usual, with a maximum velocity being sent over the interface. Alternatively, some interfaces allow for trajectories to be delivered in the form of waypoints. Using this type of an interface, the intended trajectory of robot 402 can be received and stored within OMS 410, which may then generate waypoints that are closer together or further apart depending on the safe-action constraints. Similarly, an interface that allows input of target joint torques can be used to drive trajectories computed in accordance herewith. These types of interface can also be used where SADM 425 chooses new trajectories or modifies trajectories depending on the safe-action constraints.

As with the interface used to determine robot state, if robot 402 supports a safety-rated protocol that provides real-time access to the relevant safety-rated control inputs, this may be sufficient. However, if a safety-rated protocol is not available, additional safety-rated software on the system can be used to ensure that the entire system remains safe. For example, SADM 425 may determine the expected speed and position of the robot if the robot is operating in accordance with the safe actions that have been communicated. SADM 425 then determines the robot's actual state as described above. If the robot's actions do not correspond to the expected actions, SADM 425 causes the robot to transition to a safe state, typically using an emergency stop signal. This effectively implements a real-time safety-rated control scheme without requiring a real-time safety-rated interface beyond a safety-rated stopping mechanism.

In some cases a hybrid system may be optimal—many robots have a digital input that can be used to hold a safety-monitored stop. It may be desirable to use a communication protocol for variable speed, for example, when intruding objects are relatively far from the robot, but to use a digital safety-monitored stop when the robot must come to a complete stop, for example, when intruding objects are close to the robot.

5. Monitoring a Multi-Cell Workspace

Figure 6:
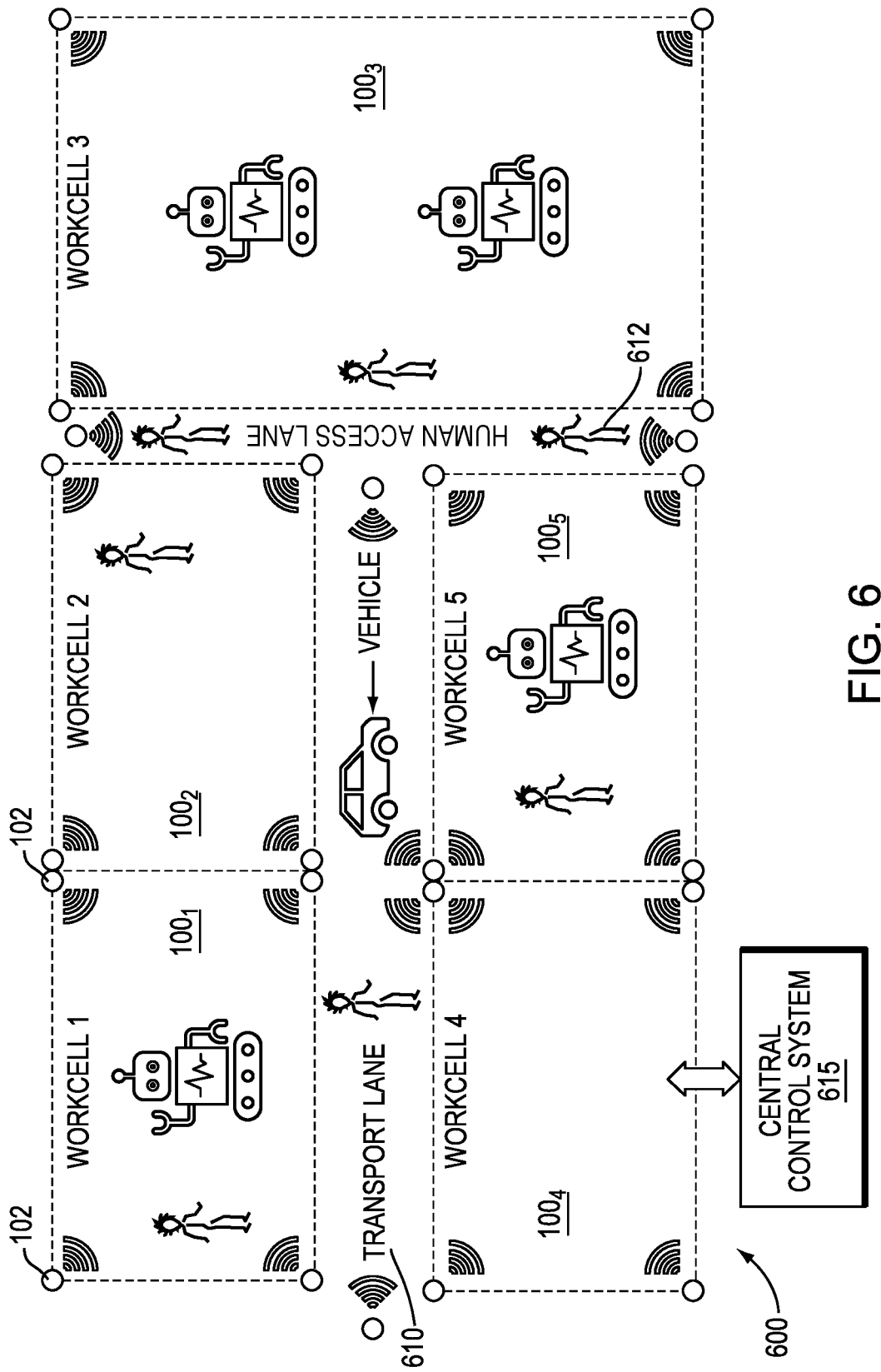
FIG. 6 schematically illustrates a workspace including a plurality of monitored workcells.

As illustrated in FIG. 6, a plurality of workcells (each with its own monitoring system) $100_1 \ldots 100_5$ may be arrayed on a factory floor 600, either contiguously or separated by workspaces, lanes or other areas where manufacturing activities do not take place but facilitate circulation, storage, and/or access to the workcells 100. For example, a transport lane 610 may facilitate vehicular movement of work in progress or materials, while a human access lane 612 may be dedicated to human traffic and exclude vehicles. The areas where manufacturing does not take place may also be covered by arrays of cameras 102 so that a contiguous factory floor area (a "covered space") can be completely managed by one or more OMSs 410 (see FIG. 4).

In one mode of operation, a plurality of OMSs 410 share cameras 102; that is, an OMS 410 responsible for a particular workcell 100 or other zone (e.g., a transport lane 610) shares sensor data with the OMSs of adjacent zones. But each OMS 410 is actually responsible, in the sense of communicating with controllers 407, only for its zone. The covered space 600 is thereby divided up into separate, possibly overlapping safety zones, each of which is the responsibility of a single OMS 410. Data from each camera, however, is sent not only to the OMS 410 responsible for the monitored zone, but also to OMSs responsible for adjacent zones. Each OMS 410 operates independently as described above, communicating with cameras to coordinate timing so that illumination from one camera is not improperly sensed by another, but also possibly receiving data from adjacent zones. This configuration may be used, for example, in the case of an assembly line, where a separate set of cameras 102 is arrayed above each assembly-line workcell. The spacing between the cameras along the assembly line may be fixed or variable, depending on the lengths of the workcells.

In FIG. 6, each of the five workcells $100_1 \ldots 100_5$ represents a manufacturing step, with work in progress handed off between workcells either adjacently (e.g., by a conveyor belt from Workcell 1 to Workcell 2), using humans (between Workcell 2 and Workcell 3 using human access lane 612), or via a vehicle—which can be a forklift, an automated guided vehicle, an autonomous vehicle, or even a pushcart (as between Workcell 3 and Workcell 4) using transport lane 610.

The approach described herein allows for the safe monitoring and control of multiple workcells and other zones (each of which is monitored by an OMS 410, which may be associated with a discrete control system 112 or, in some implementations, a single control system 112 may support multiple OMSs 410 each associated with a different monitored zone) in the presence of humans and other moving equipment. This monitoring and control allows humans and machines (either moving or fixed) to safely operate in the same space across multiple workcells and workspaces in a factory. Embodiments of the invention operate by registering the cameras 102 responsible for each monitored zone 100 with respect to other zones' cameras and with respect to any fixed equipment under control in the monitored zone 100, as described above, and continuing to safely monitor this registration during operation of the factory; for each monitored zone 100, analyzing sensor input from the zone itself and from adjacent zones to identify regions that are occupied or may be occupied in the future by humans or other moving machinery; identifying and classifying objects in each monitored zone the motion of objects between adjacent monitored zones; maintaining a record of the identified objects and their positions and trajectories, as well as occlusions and unsafe spaces in each of the monitored zones; in some embodiments, transferring that information to OMSs responsible for adjacent zones as humans and machinery move between zones; and generating control outputs for machinery and for moving equipment in the monitored zones so as to allow safe interaction with humans.

These control outputs may include safety slow or stop signals for equipment or moving machinery that has been designated as dangerous if it comes in close proximity or contact with humans or other objects classified as obstructions. This designation can be temporary, for example, for an object identified as an autonomous vehicle, which may carry work in progress independently of human interaction; while stopped, the vehicle is safe for humans to approach. The designation can instead be permanent, as for a robot that does not interact with humans at any time during operation.

Embodiments of the invention may include methods and equipment for mapping individual cameras to other cameras in the same or adjacent monitored zone, and OMSs (and, in some cases, discrete control systems 112) assigned to specific zones; methods and equipment for interference and crosstalk mitigation among cameras in a zone and among cameras in adjacent zones; methods and equipment for safely transferring occlusion and unsafe-space data in a specific zone to adjacent zones; and methods and equipment for dynamically mapping control signals to specific machinery, which can be stationary (e.g., robots mounted on a fixed base) or mobile (e.g., automated guided vehicles).

With reference to FIGS. 3-6, in another mode of operation, instead of having controllers responsible for adjacent workspace areas cooperate with each other individually as described above, a central supervisory control system 615 oversees multiple sets of zone-specific cameras 102 or even the entire workspace 600, and receives data from all cameras 102 under its supervision. Central control system 615, which may have the same overall architecture as control system 112, stores a space map 345 of the multi-zone area it monitors; the constituent zones of the space map may be represented separately as zone maps to simplify communication with the controllers 407 that control equipment 402 in each zone. The zone maps are contiguous at the voxel level, so that explicit registration among cameras in different zones is unnecessary. Movement of people or equipment from zone to zone is readily predicted, and in this embodiment, central control system 615 transmits details of an impending intrusion to the OMS 410 responsible for the affected zone. That OMS integrates the transmitted details into its space map representation of its zone representation and reacts accordingly to maintain safe conditions therein—e.g., shutting down or limiting operation of equipment in the computed path of an intruding human or taking no action if the intruder is, for example, a conveyance system equipped to interact with workcell equipment to avoid collision.

5.1 Registering and Monitoring Sensors Among Zones

For embodiments that utilize local communication among OMSs assigned to adjacent zones, registration among cameras 102 (both in the same zone and in adjacent zones) can be achieved by comparing all or part of each camera image to the images generated by other cameras and using conventional computer-vision techniques to identify correspondences among those images. If there is sufficient overlap among the fields of view of the various cameras, and sufficient detail in the monitored space to provide distinct images, it may be enough to compare images of the static zone. If this is not the case, then as described above, a registration object having a distinctive signature in 3D can be placed in a location where it can be seen by a sufficient number of cameras. This object can be mounted on a cart and moved through the different monitored zones so as to facilitate joint registration of cameras covering all the zones and, thereby, registration between adjacent zones. If sufficient overlap between camera fields of view is not present, registration can instead be based on knowledge of the relative positions and orientations of the machinery.

Alternatively, registration can be achieved by allowing the system—i.e., central controller 615 via all of the cameras 102—to observe one or more humans walking throughout the entire covered space 600 over a period of time, or mobile vehicles moving between zones, combining a sufficient number of partially matching images until accurate registration between adjacent workcells and workspaces is obtained. A conventional mapping tool providing a visual representation of the cameras 102 on the factory floor 600 may be employed to help lay out the required number of cameras at the proper locations to cover the entire area without spatial coverage gaps.

Other approaches to registration include the placement within zones of permanent markers or fiducials whose only purpose is registration, allowing for continuous verification of registration among the cameras for each zone (and those of adjacent zones whose fields of view include the marker). These markers may be sensitive to visible light, for example, so that an RGB camera permanently aligned with the cameras can serve as a registration device, or alternatively, the markers may be IR-sensitive so they can be detected by other sensing modalities such as IR time-of-flight cameras.

The same algorithms used for initial registration can be extended to monitor continued accuracy of registration. A metric (e.g., squared error) can be calculated during initial registration, capturing the accuracy of fit of the observed data to a model of static elements (for example, fixtures or light poles) within the overall space 600. As the system operates, the same metric can be recalculated. If that metric exceeds a specified threshold, the registration is considered to be invalid and an error condition is triggered in the software which will transition the machinery to a safe state. This safe state can be local to a specific zone or area of the factory 600 or may cover some or all of the zones. Insufficiently observable areas that are guarded by other modalities may be considered safe and override the built-in inherent safety.

5.2 Mitigating Camera Crosstalk Among Zones

The performance of a given sensor can be adversely affected by interference from one or more light sources. For a particular 3D ToF camera, interference occurs when a light source at or near the sensing frequency other than reflected light from the camera illumination is captured by the sensor (s). This light source can be ambient light (natural and/or artificial), an IR point source (such as from welding or flame), or reflected illumination from other cameras in the vicinity. These other cameras can be 3D ToF cameras similar to the first camera, or can be other types of cameras or sensors utilizing a light source at or near the same sensing frequency (such as IR cameras, barcode readers, or position sensors). Interference between similar cameras is also known as crosstalk.

Interference can distort sensing and depth measurements, introducing noise, background level errors, artifacts ("objects" sensed by the camera that do not exist in the volume being sensed), or lead to depth error calculations. For work environments involving human safety, the architecture and operation of a monitoring and control system should meet industrial safety standards relating to protection from interference and crosstalk. These standards dictate the extent of the allowable interference and resulting sensing errors. Although sensors within a workcell are typically operated to avoid crosstalk, the problem becomes far more complex in production environments involving multiple contiguous workcells, each of which may have neighbors with independently operating sensors or cameras. Accordingly, there is a need for measures to minimize or mitigate crosstalk among sensors or cameras in factory-scale settings involving independently monitored workcells.

For a given sensing zone (for example, a factory workcell), all the cameras may be controlled by a zone-level control system, which triggers data capture sequentially so as to avoid interference or crosstalk among cameras. This can be achieved using, for example, time-division or frequency-division multiplexing (or both), where the zone-level control system assigns an illumination wavelength and/or modulation frequency and/or time slices to cameras during the startup or configuration phase or dynamically during operation so that each individual camera does not generate illumination that can be sensed by other cameras in the zone.

In time-division multiplexing, each camera illuminates the sensing zone sequentially in time so that by the time the second camera illuminates the zone, the illumination from the first camera is no longer detectable (to an acceptable threshold) by the second camera. In frequency-division multiplexing, each camera is configured to sense illumination of a given wavelength or wavelength band, or a particular modulation frequency. Each camera illuminates at a wavelength or modulation frequency that is sufficiently distinct from the sensing and illumination of other cameras that interference is minimized to an acceptable threshold or eliminated completely.

Zone-level control can be operated or managed by a zone-specific controller 112 or a central control system 615, specifying the mode and the parameters of the interference mitigation (e.g., time-division or frequency-division and the associated parameters such as timings, illumination wavelengths and/or modulation frequencies). Crosstalk mitigation among cameras in adjacent zones is not only valuable for meeting safety standards in human sensing, but also for extending functionality to large robotic workcells, multi-robot workcells, or applications where robots and/or machinery move between adjacent workcells or sensing zones.

The simplest way to avoid crosstalk among cameras in adjacent zones is by maintaining a sufficient distance between adjacent zones to prevent illumination from one zone from reaching another zone. If two zones are adequately separated physically, the illumination that "spills" from one zone to the other will not cause interference. In practice, this distance is in the order of a few meters, but depends on the orientation and coverage of the cameras on each of the zones. This approach may not be practical in active factories and warehouses where space is at a premium. Another simple expedient, however, is to install an opaque material barrier between adjacent workcells, physically separating them and preventing illumination interference. This precludes or complicates access between adjacent workcells, however, and as a result is also generally not feasible.

Instead, the general approach taken herein is to determine, for a first workcell $100_1$, which neighboring workcells (e.g., workcells $100_2$, $100_3$, $100_4$) include cameras 102 whose operation causes crosstalk with the cameras in the first workcell $100_1$; compute a noninterference scheme for simultaneously operating the cameras of the first workcell $100_1$ and the neighboring workcells substantially without crosstalk; and cause the cameras of the first workcell $100_1$ and the neighboring workcells to operate simultaneously in accordance with the noninterference scheme.

In fully distributed implementations, each pair or small group of workcells may have a local master (e.g., within controller 112) that coordinates the triggering (in time, wavelength, or modulation frequency) and data capture of the cameras of that pair or small group of workcells. The local masters of all the grouped workcells coordinate to mitigate interference among the zone groups and, therefore, at the zone level as well. In centralized implementations, instead of having controllers responsible for adjacent workspace areas cooperate with each other individually, a central supervisory control system 615 oversees multiple sets of zone-specific cameras or even the entire workspace, and receives data from all cameras under its supervision.

Similar to interference mitigation for a single zone, interference mitigation between zones can be achieved using time-division or frequency-division multiplexing (or a combination of both), where a control system assigns illumination wavelengths, modulation frequencies or time slices to zones and cameras during the startup or configuration phase. Frequency-division multiplexing can be enabled by changing either or both of the illumination wavelength or the modulation frequency. Other approaches involve static or dynamic interference maps that can be determined experimentally and used as inputs to the cameras to adjust for background interference.

In time-division multiplexing, cameras in the same workcell are prevented from interfering with each other by assigning them different time slots. All cameras receive a frame start signal from a controller via (for example) an RS-485 protocol or similar low-latency protocol and are active only during their assigned time slots (relative to the frame start). This approach may be extended to adjacent workcells by multiplexing the cameras of both workcells and keying their time-multiplexed operation to the same frame start signal. In one embodiment, separate, non-overlapping time slices are assigned to the cameras of both workcells by a central controller 615 or by cooperation between controllers 112 active in each workcell. For example, controllers 112 can communicate with each other in a round-robin fashion and adjudicate time-slot assignments for potentially interfering cameras. The clocks on the controllers 112 may be synchronized so they share the same frame start time without drift. In particular, this noninterference scheme assigns camera time slots so that cameras with overlapping illumination fields of view have different time slots. Controller clocks may be synchronized in a hierarchical (e.g., primary-secondary for two controllers) arrangement, through an external source, or using a Precision Time Protocol (PTP) or Synchronous Ethernet. Alternatively, if two clock frequencies are identical and phases are precise and stable enough, the phase between the signals can be considered constant and it is possible to determine precisely how often the two workcells interfere with each other. If the two clock frequencies drift relative to each other (in frequency or phase) but this drift can be estimated or experimentally determined with an adequate level of precision, the drift can be incorporated into the interference calculation and the timing of the camera activations so as to prevent interference.

The noninterference scheme is generally implemented on a camera level rather than a workcell level, since only some of the cameras of a particular workcell are likely to interfere with those of a neighboring workcell. If some of the cameras in a first workcell are far enough (e.g., 2-4 meters) from the nearest cameras in a neighboring workcell, it is possible to assign the same timeslots to non-interfering cameras of both workcells, since their simultaneous operation will not cause interference. The number of independent timeslots needed in a given configuration will depend on camera geometry and locations. Graph coloring algorithms, for example, can be used to determine the minimum number of timeslots among all workcells in a facility.

Frequency-division multiplexing schemes assign different emission frequencies, rather than time slots, to potentially interfering cameras, thereby enabling fully simultaneous operation. Accordingly, time synchronization among cameras in different workcells is unnecessary as long as enough different frequencies are available. In the worst case, a separate frequency is assigned to each camera that may interfere with other cameras. Similar to assignment of time slots in the time-division multiplexing schemes described above, however, the number of independent operating frequencies needed in a given configuration will depend on camera geometry and locations. Once again, graph coloring algorithms can be used to determine the minimum number of frequencies among all workcells in a facility.

In another embodiment, the two control systems in the two potentially interfering workcells are connected so that one of the two (or a third, separate system) controls the clock and frequency of each camera turning on and off either using spread-spectrum or chirping techniques to lower interference. The variations in clock timing and frequency of each camera can be random or deterministic, as long as the resulting interference is of a sufficiently low threshold. In spread-spectrum, the normally narrow-band information present in the illumination frequency is spread over a wider band of frequencies. The structure of the frequency spreading is known to the receiving camera so that two illuminators at the same frequency can be decoded separately by the receiving camera. A number of spread spectrum techniques can be applied, such as frequency-hopping spread spectrum, or chirping. In chirping, the illumination frequency is modulated so as to increase or decrease in frequency over time. A camera that is calibrated to receive this chirped frequency can discriminate among other sources of illumination at the same frequency but a different chirp pattern.

In various embodiments, the noninterference scheme may be based on a background interference map. This may be constructed by accumulating the illumination levels recorded by each camera with various other cameras active, and with no cameras active (the latter called a "dark frame" and capturing only ambient illumination or other sources of infrared illumination, which will contain the sensing frequency at some level). This procedure identifies, for each camera, the cameras or illumination sources of neighboring workcells that may interfere with it individually or in combination. For any given camera, it is only interfering cameras or camera combinations that must be mitigated; cameras whose illumination levels are non-interfering for other cameras need not be considered in a mitigation scheme.

Once the background interference map is generated, a mitigation scheme can be computationally defined. This may include time-division multiplexing and/or frequency-division multiplexing, as described above, but may also or alternatively include strategies such as beam steering, camera repositioning or selective beam blockage. For example, beam position may be under the control of a local or supervisory control system. When cameras are identified as interfering in the background interference map, the control system may electronically reposition the camera or reorient the camera beam (e.g., by selectively activating the LEDs of an array in the camera or otherwise steering the beam). The control system ensures that any repositioning or reorientation will not interfere with adequate camera coverage of the workcell and may reposition or reorient other cameras to compensate. The background interference map can also be used as a guide to manually install opaque shielding around or between cameras to prevent interference without changing the position or orientation of the interfering camera, but without preventing movement through workcell partitions. In addition, the background (ambient) illumination sensed by a given camera may be subtracted from the received signal during operation in order to remove what is essentially noise and thereby improve sensitivity. The subtraction may vary over the sensed wavelength spectrum, with different frequencies associated with different levels of amplitude reduction in order to optimize performance.

The noninterference scheme may be system-wide, i.e., extend over all workcells of a facility, and may be implemented by a single central controller, distributed controllers associated with each of the workcells, or some intermediate arrangement of controllers. In distributed implementations, each controller may have system-wide information (e.g., they may store a background reference map) but only execute the mitigation steps relevant to the cameras under its control.

It should be emphasized that the foregoing approach may be applied to interfering light sources other than those providing camera illumination. When analyzing interference from external sources, all sensors in the cameras may be placed in a "listening mode" (without any illumination) to assess the presence of interference. Controller 112 or control system 615 receives data from the cameras at the configured frame rate and processes the results to determine if there is interference by thresholding on received intensity. If so, a noninterference scheme for operation of the problematic light sources is generated as discussed above.

5.3 Identifying Occupied and Potentially Occupied Areas Between Workcells and Workspaces Once the cameras have been registered across all active zones, the system identifies, at a high fixed frequency, all intrusions in the zones monitored by the system. Data from multiple cameras in a zone are aggregated to identify, at a voxel level, the 3D boundaries of the zone. In embodiments employing a central control system 615, this boundary data is aligned with data from adjacent zones to map the entire covered space 600 at the voxel level. As described above, if a camera detects anything in a given voxel, all voxels that lie further from the camera on the ray beginning at the focal point of that camera and passing through the occupied voxel are then determined to be occluded for that camera; whereas everything lying between the camera and the occupied voxel can be considered empty.

Control system 615 combines information from all cameras 102 to determine which areas are jointly occluded from all cameras in specific zones and across adjacent zones. If necessary, redundant cameras can be used so that a voxel must be observed by more than one camera in order to be considered empty by the system. All space that cannot be confirmed as empty is marked as unknown. Central control system 615 may also perform background subtraction as described above, identifying all voxels occupied by the static elements of the zones. The 3D models of machinery designed to move among zones (for example, forklifts, automated guided vehicles, rails, conveyors, and mobile robots or robots mounted on vehicles) are considered part of the "background" but are identified as objects capable of moving inside or between zones. This 3D data model of the factory 600 can be generated by commercially available factory-design software tools.

Once again, a teaching step can also be included. In one approach, individual pieces of mobile machinery, conveyors, etc. are operated in isolation, and central control system 615 may include a machine learning component (e.g., a neural network) that learns the expected motions of each piece of mobile equipment based on the teaching step. In addition, as noted above, the teaching step may supply images or key features of a workpiece. The trained system may thereby develop an internal model of expected motion (and/or maximum velocity) of movable equipment in order to predict possible collisions within a zone or between zones. With the ability to recognize mobile equipment and workpieces, the system can conservatively treat all unrecognized objects as potentially human and to be avoided. Alternatively, or in addition, entries from a simple reference library of object motions and maximum velocities can be associated with mobile objects as they are identified, either specifically or by category (e.g., forklifts or motorized carts) and provide the basis for motion prediction.

A second approach is to specify particular regions in a factory-level space map 345 where mobile elements will enter a zone, such as the zone edges. Only objects that enter a zone at such specified locations are considered eligible to move into and within the zone; otherwise, an object is identified as an intrusion. The moving objects can then be modeled and tracked from the time they enter the covered space until the time they leave it. Modeling can involve simple extrapolation of the current object trajectory, taking into account obstructions and the likely path around them, or can be based on movement capabilities associated with the object or its class. The actual trajectory may be confirmed at the next mapping cycle and a new trajectory recomputed. Alternatively, the planned trajectory may be supplied by the moving object, e.g., as a wireless transmission to the workspace-level control system 615 or to the local zone OMS, which may share the data with OMSs of adjacent zones so that zone-spanning object trajectories can be tracked.

Mobile elements not identified as intrusions can be subtracted from future measurements, but continuous monitoring ensures that the observed background image is consistent with the image stored during the startup period. Additionally, it is necessary to identify areas occluded by objects in the background, and handle these unknown areas correctly as described above. These occlusions can be permanent, such as those created by fixed machinery in the workcell, or they can be temporary, such as those created by a moving vehicle or a human within a zone. Moving objects previously identified as eligible to operate in a zone may be monitored by central control system 615 or local zone OMSs and prospectively tracked based on all possible object configurations, physical positions and velocities.

5.4 Classifying Objects in and Between Zones

At their simplest level, the above procedures provide central control system 615 with an internal, voxel-level representation of each monitored zone 100 specifying regions that are known to be occupied and/or potentially occupied. For some applications, this rudimentary representation may be sufficient—that is, if the system is monitoring space in which there should be no moving objects other than those identified as part of the background. More commonly, however, object-level identification is necessary, e.g., where normal operation involves moving machinery parts, work in progress, mobile robots or other vehicles, etc. Such objects are usually not part of the original background map of fixed and mobile objects, and to identify them, it is generally useful to cluster individual occupied voxels for analysis at a higher (i.e., object) level as described above.

In particular, clusters can be tracked over time simply by associating clusters in the current camera-image frame with nearby clusters in previous frames or using more sophisticated techniques (such as k-means clustering or support vector machines), either within a zone or between adjacent zones. The shape, size, or other features of a cluster can be identified and tracked from one zone to the next as it crosses known zone boundaries. Once the clusters have been identified, additional techniques can be applied to classify and map their precise location as they move. Certain moving objects, such as mobile robots or automated guided vehicles, may have the ability to wirelessly transmit (using one of the above-noted communication protocols, for example) their classification, location, and orientation to external sensing elements or directly to central control system 615 or local control systems 112. A moving object may utilize location beacons or fiducial markers that it can identify in order to ascertain its location. Other moving objects, including those that are not traditionally fitted with cameras (such as forklifts, workpieces, work in process, or even humans) can be independently fitted with location cameras that may then be mapped to identified voxel clusters for classification.

Another approach is to use external inputs to mark specific clusters as being humans, machinery, work in progress, or workpieces through a user interface. An initial object-level classification of identified clusters can be performed based on this external input. Input data may come from operators manually identifying specific clusters as machines, humans, workpieces, or work in progress, or from learning software (e.g., a Bayes classifier or a system configured for object detection and classification) that automatically classifies specific clusters from information in its database or prior knowledge. One embodiment of this approach is to identify all known objects in the space and classify anything else as an obstruction. In another embodiment, only those items needing protection, such as humans, are positively identified. Any cluster not classified in the initial step (such as a human entering the covered area after classification) may be considered an obstruction to be avoided by moving machinery.

5.5 Handling Entry Points and Combined Zones

The need to classify newly detected clusters, and the resulting computational burden until classification is achieved or a control system determines that the cluster may be safely ignored, can be reduced when the cluster is first detected at an entry point to a monitored workcell. The concept of an "entry point" for purposes hereof is flexible; it need not be a doorway or opening in a wall. Hence, the terms "entry point" and "portal" are used broadly herein to connote a boundary, which may be physical or simply defined as a plane in space, between adjacent spatial regions that humans or mobile machinery may cross.

Figure 7A:
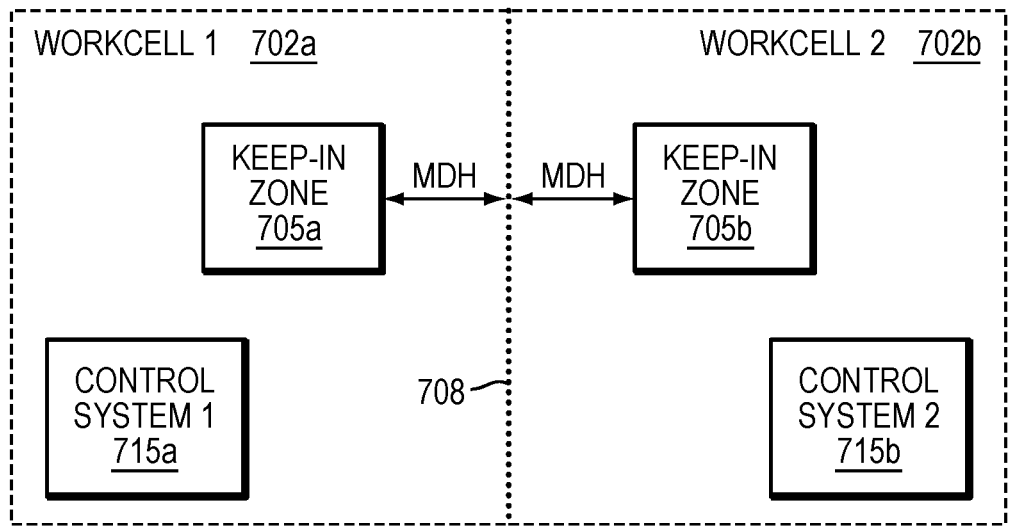
FIGS. 7A-7C schematically illustrate adjacent, overlapping, and large workcells, respectively, and associated monitoring strategies.

FIG. 7A illustrates two adjacent workcells 702a, 702b. In each workcell is machinery 705a, 705b that operates within an associated keep-in zone and has an associated "minimum distance to hazard" (MDH), i.e., the maximum distance between a human and the operating machine at which the machine can operate at full speed. The workcells 702a, 702b are each monitored by a suitable safeguarding system, e.g., a control system and a series of 3D cameras as described above, or 2D sensors such as scanners or LIDAR. If the control system detects a human closer than the MDH to one of the machines 705, it will slow down or stop the operation of the machine. The illustrated MDHs are shown, for ease of illustration, as identical in size and extending to the entry point 708, which may simply be the boundary between the workcells 702a, 702b; humans and mobile robots may freely pass through the entry point 708. The monitoring system for each workcell 702a, 702b has full coverage of the workcell including the entry point 708. Separate dedicated control systems 715a, 715b as described above may be responsible for each of the workcells 702a, 702b, or a single control system may receive sensor data from both workcells' cameras and control the operation of machinery 705a, 705b. As long as the sensing systems responsible for the workcells 702a, 702b do not interfere with each other, both areas can be independently protected.

If a single control system is used to monitor both workcells 702a, 702b, then the movement of a human or mobile robot from one workcell into the other does not pose a computational or productivity (in the sense of unnecessary stopping or slowdown) burden; despite the handoff from one set of workcell cameras to another, monitored objects retain their classifications and need not be reclassified. If, on the other hand, the control systems are independent as illustrated in FIG. 7A, each system is configured to detect or predict passage of a human through the entry point—i.e., the human's impending exit from the monitored workcell and entry into the adjacent workcell. In some embodiments, the control system 715a, 715b issues an alert signal to the other control system when a human being tracked in the workcell reaches the entry point 708 or is very close (e.g., within one meter or in a defined zone) to it—e.g., as described above, the identified human and his or her current position and trajectory may be transferred to the OMS associated with the other control system. As a result, it is not necessary for either control system to analyze detected features at the entry point 708 to determine whether they are associated with a human except following receipt of a signal from the other monitoring system indicating expected entry of a human.

In other embodiments, the control system 715a, 715b may track all objects and humans within the associated workcell and extrapolate or otherwise predict (e.g., based on a model of human movement capabilities) their current trajectories, taking into account obstructions and the likely path around them. When the control system predicts that a tracked human will traverse the entry point 708, it communicates the trajectory and object classification (here, human) to the workspace-level control system responsible for the adjacent workcell (or to the local zone OMS). Once again, the ability to share zone-spanning object trajectories between zones allows the control system receiving the alert to detect, and immediately classify as human and subsequently track, an observed feature at the actual or predicted position along the entry point 708. If the human moves away from, or does not actually cross the entry point 708, the control system that issued the alert may withdraw it, or it may simply expire after one or a predetermined number of update cycles at the receiving control system.

Figure 7B:
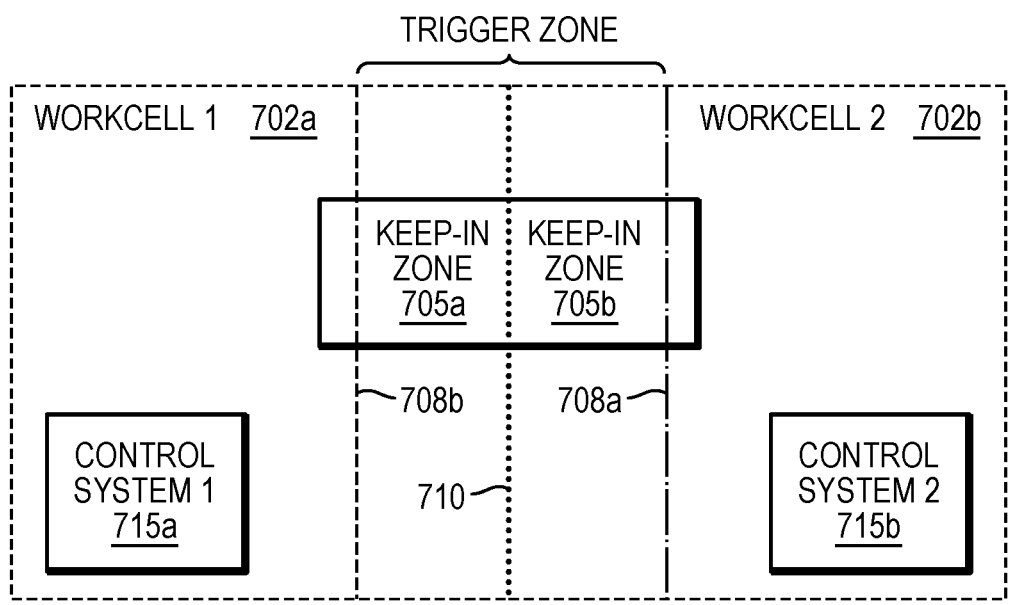

In modern production environments, workspace flexibility on the factory floor may be essential as products evolve, customer demand shifts and equipment is upgraded. Fixed physical partitioning among workcells may be unrealistic; instead, factory floors (or large portions thereof) may be open-plan with workcells defined as floor areas and reconfigured as needs change. As long as control and sensor systems can operate these open-area workcells safely, and workers can navigate them without confusion, there is no strict limit on size, numbers, and configuration. In some cases, as illustrated in FIG. 7B, workcells can overlap; in other cases, a workcell is so large that multiple monitoring systems are necessary to cover the entire space. For example, workcells may have reconfigurable partitions that can be moved or removed to change the footprint of a work space.

In the illustrated overlapping case (FIG. 7B), the transition from the zone monitored by one system to that monitored by another is, in effect, an entry point or boundary 710 extending midway between the zone boundaries 708a (of the zone 702a) and 708b (of the zone 702b). This central boundary 710 may be used to ensure that only one control system 715a, 715b keeps track of objects or humans in the region labeled "Trigger Zone." Suppose, for example, that a human operator in Workcell 1 crosses the zone boundary 708b and so now is within both zones 702a, 702b. Control System 1 will continue to monitor the operator until she crosses the central boundary 710, at which point Control System 1 will hand off monitoring of the operator to Control System 2. Hence, in this configuration, robots can be closer together and the monitored space can be smaller if Control Systems 1 and 2 communicate. If they cannot, robots must be at least MDH away from each other with the control system of each workcell monitoring the overlapping MDH.

Figure 7C:
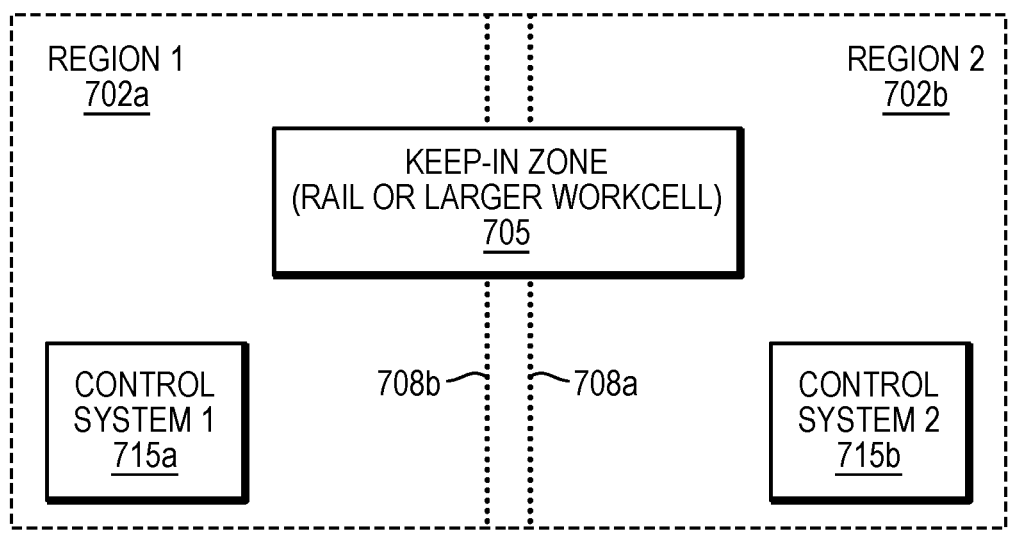

The case involving a large workcell with multiple independent monitoring systems is illustrated in FIG. 7C. The monitoring zone 702a, corresponding to Region 1, extends to the entry point 708a and the monitoring zone 702b, corresponding to Region 2, extends to the entry point 708b. In this case, the overlap region is small and a central or intermediate boundary is not defined. When a human operator in Region 1 crosses the zone boundary 708b and so now is within both zones 702a, 702b, Control System 1 continues to monitor the operator until he approaches the boundary 708a of Region 1. When Control System 1 predicts that the operator will cross the boundary 708a imminently (or detects the operator's presence at the boundary), it hands off monitoring to Control System 2 as described above in connection with FIG. 7A. Alternatively, Control System 1 may hand off monitoring responsibility to Control System 2 as soon as the operator crosses the boundary 708b.

It is possible that some cameras of each of the zones 702a, 702b near the overlap region will interfere with each other, i.e., cause crosstalk. In such cases, crosstalk mitigation as described above may be applied to the crosstalk-vulnerable cameras.

The handoff strategies described in connection with FIGS. 7A-7C presume the existence of monitoring capability on each side of an entry point. In some situations, the area on the other side of an exit point may be unmonitored yet may nonetheless contain hazards. The area may be unmonitored because human entry is not expected or because a sensing system cannot cover the entire hazardous area in a safe way. In such cases, the control system for the monitored workcell may sense departure of a human through the exit point and thereupon signal the controller responsible for dangerous machinery in the unmonitored region to put the machinery in a safe state. If all human-accessible entry points to an unmonitored space containing hazards originate in monitored regions, the unmonitored space is safe in that it will be impossible for a human to enter the space without detection.

Of course, the absence of monitoring means there is no opportunity to vary the machinery speed (or automatically restart after a shutdown) based on the actual level of danger to a human entrant—the machinery either operates normally or is shut down. But the impact on productivity is minimal since human entry is not expected and will therefore be rare.

Furthermore, in some embodiments it is not necessary to have full sensor and OMS systems in order to identify humans. For example, while a control system 715 may benefit computationally from being alerted to the imminent entry of a human into its monitored space, the human may be detected by modalities other than another control system 715 in an adjacent space. Humans may be identified, and reliably distinguished from non-human objects, by existing safeguarding, which include safety mats, light curtains, and 2D scanners. Safety mats are generally placed around machinery to be safeguarded, and any weight above a set threshold is considered an unsafe human intrusion, which can trigger a signal to place the safeguarded machinery in a safe state. Light curtains consist of vertically arranged pairs of light beams and corresponding sensing elements placed a horizontal distance away. When there is no intrusion, the sensing elements continuously detect the light beams. However, whenever an object passes through and interrupts the light beams, an intrusion is registered, which can then trigger a signal to put the safeguarded machinery in a safe state. A 2D scanner uses a continuously rotating laser beam to scan a horizontal plane. The beam return signal is used to map the distance between the scanner and the signal return point. An intrusion in the plane of the 2D scanner produces a shorter return signal, which may be used to trigger a signal to put the safeguarded machinery in a safe state.

In general, these existing safeguarding approaches are unable to reliably distinguish humans from other intrusions in their field of view. For example, a weight placed on a safety mat, a bird crossing through a light curtain, or a rodent crossing the plane of the 2D scanner would all trigger an intrusion signal and an unnecessary stop of the safeguarded machinery. However, by carefully arranging these safeguarding approaches in application-specific configurations it is possible to identify humans and reliably distinguish them from non-human objects with high probability. For example, a workcell can be safeguarded by a light curtain arranged in a vertical plane at a single entry point, and only allowed to trigger a safety signal if the number of light beams being blocked by the intrusion is sufficiently large to be caused by a human. To further narrow the human identification, a safety mat can be placed inside the workcell, adjacent to the light curtain, and set to trigger only if the weight placed on it would be in the range of a human, but not if the weight is too small (for example, a rodent) or too large (for example, a forklift). Similarly, a series of 2D scanners can be arrayed along the vertical axis of the workcell so that a human intrusion is registered only if a critical number of the scanners detect a passing object, which would be the case for a human walking into the cell, but not a rodent or a bird triggering only one of the 2D scanners. Other configurations can be designed that would allow existing safeguarding methods to identify a human intrusion with reasonable reliability; such identifications may be transmitted to control system 715 in the adjacent safeguarded space.

5.6 Maintaining and Updating Record of Objects, Occlusions, and Unsafe Spaces in the Workcells and Workspaces In a central-controller implementation, zone-level occlusion data may be reduced and the boundaries of all zones identified and merged in a factory-level space map. In one embodiment, a zone-level data structure stores moving object positions, current and future trajectories, and all occlusions and obstructions in the associated zone. Central control system 615 passes this data structure to adjacent zones as humans, mobile machines, or work in progress move (or are predicted to possibly move) between zones. The data structure may be a C structure or linked list, a Python list or dictionary, a table, a relational or flat-file database, or other suitable representation.

In distributed, zone-level implementations, on the other hand, each OMS associates a data structure with each identified and classified mobile object (be it a human, a machine, or work in progress) in the zone and passes this data structure to OMSs of adjacent zones as the classified mobile objects move between (or are predicted to move between) zones. An object's data structure is updated, in real time as the object moves, with its new location, trajectory, and possible future position. As object motion alters the occlusions and unsafe spaces in the zone, the occlusion and unsafe space map is also updated.

For example, as a human moves in a workcell, space occluded by the human as seen by a specific camera becomes visible while other space previously visible becomes occluded. This information is used to update the zone-level data structure and/or data structures associated with each of the moving objects in the zone. These moving objects may include machinery that moves in place, such as a robot that is fixed in place but is able to move its arm over a fixed volume, generating occlusions, obstructions, and unsafe spaces (e.g., pinch points) as it moves.

5.7 Generating Safe Control Outputs from the Covered Zone

At this stage, central control system 615 has, or the zone-specific OMSs collectively have, identified all objects (fixed, movable, and intrusions such as humans), their locations, and their trajectories that must be considered for safety purposes. All occlusions and unsafe spaces associated with the objects (both fixed and movable) have been identified and mapped. Given these data, a variety of control outputs can be generated. Since all of the steps performed thus far can be implemented for safety-critical applications, these control outputs can meet relevant reliability standards.

The simplest types of output are binary signals indicating intrusions in various zones. These binary signals can be independent or connected through PLCs dedicated to the workspace mapping system (e.g., analysis module 342). These signals can be further connected to external safety PLCs to aggregate to the factory-level SCADA or MES system, as well as directly to equipment within the workspace for immediate response. Zone intrusion information can also be delivered over a digital communication protocol such as fieldbus, ethernet, or wireless. The SCADA or MES system can then relay slow down, stop, or other safety information to machinery (either fixed or mobile) inside the covered space, whose dedicated controllers will issue appropriate commands. This information transfer can occur through wired or wireless means. A wireless signal interface may be required, for example, when relaying safety information to a mobile robot.

Another desirable output is the distance between any intrusion in the sensed area and a moving or stationary machine, comparable to the output of a 2D proximity sensor. This quantity may be converted into a binary signal using a proximity threshold below which the output is asserted. It may also be desirable for the system (i.e., central control system 615 or the OMSs) to provide the location, extent and/or shape of the intrusions closest to the machine.

The possibility of collisions may be monitored as described above with respect to FIG. 5, using concentric 3D safety envelopes. The locations and 3D extents of these safety envelopes are updated at each time step as the machinery operates and humans or mobile machinery classified as intrusions move about and among safety envelopes 502, 508, 510. These updates are affected by refreshing the data structures that maintain, in real time, the location and trajectory of all objects in the workcell and the occlusions and unsafe spaces they generate as they move in the workcell and between zones. The volumes surrounding the moving objects (determined by their position and estimated trajectories) that are deemed unsafe for volumes of nearby objects to overlap are continuously checked for collisions or movements that bring them on a potential collision course.

In various embodiments, if safety envelopes approach each other, the machinery is slowed down or stopped and the humans in the workcell are alerted with a warning. If envelopes intersect, the machinery is halted, and a safety violation alert is sounded. When the human causing the warning or violation moves out of the way, the alarm ceases, and the machinery resumes its normal operation. As objects move through the zones, the signals associated with specific machinery (for example, an emergency stop for a mobile robot) may be dynamically mapped to different controllers 407 as the mobile machinery and the humans move between zones. This allows the specific control loop for a piece of machinery to "follow" the machine as it travels. This signal handoff may be performed in a safety-rated manner, with dual channel signal paths and fail-safe architectures.

5.8 Safety Architecture Description and Considerations

Because systems utilizing the approaches described herein involve human safety, the architecture and operation of the system should meet industrial safety standards relating to uptime, latency, and protection from interference. In distributed embodiments, each of the zone camera arrays and the associated OMS can be considered an independent unit of operation, with its own safety protocol and operation. As detailed above, these zone-level systems can be connected to the systems of adjacent zones (for example, to identify intrusions moving from zone to zone) so that communication is independent and to adjacent nearest neighbors only. Communications between zones desirably take place using protocols that are dual-channel and fail-safe, allowing for safety-rated communication and operation.

In addition to zone-level processors, the overall system may have a supervisory processor that continuously checks the functioning and state of each camera, camera group, and controllers, identifying fault conditions, both from intrusions and from equipment failures or interference. Furthermore, the data structures that contain the position, trajectory, occlusion and unsafe space data for each identified object may also be stored and maintained in a safety-rated manner. As the data structures are updated, backup copies may be sent to central control system 615, which continuously verifies that the two copies of the data structure (its own and those generated by zone OMSs) are always identical. Any deviation in form or content may trigger an alarm and a stop signal for the specific object where there is a data mismatch, or the system as a whole. The communication protocol that transfers the object data structure between controllers is also desirably dual channel, so that failures of the communication channel do not trigger system failures unrelated to potential collisions or unsafe conditions on the factory floor.

Certain embodiments of the present invention are described above. It is, however, expressly noted that the present invention is not limited to those embodiments; rather, additions and modifications to what is expressly described herein are also included within the scope of the invention.

What is claimed is:

1. A method of monitoring a portal between adjacent first and second three-dimensional workcells each of which includes controlled machinery, the portal being traversable by humans from either of the workcells into the other workcell, at least the second workcell including a monitoring system comprising a plurality of cameras distributed thereabout, the method comprising the steps of:
   computationally predicting that a human will cross the portal from the first workcell into the second workcell; and
   electronically signaling the monitoring system of the second workcell of expected entry of the identified first human into the second workcell,
   wherein the monitoring system of the second workcell does not analyze detected features at the portal to determine whether they are associated with a human except following receipt of the signal indicating expected entry of a human into the second workcell through the portal.

2. The method of claim 1, further comprising the steps of:
   computationally identifying, by the monitoring system of the second workcell, a second human in the second workcell based on images of the second workcell recorded by at least one of the cameras therein;
   computationally predicting, based at least in part on the recorded images, that the identified second human will cross the portal into the first workcell; and
   electronically signaling, by the monitoring system of the second workcell, a monitoring system of the first workcell of expected entry of the identified second human into the first workcell,
   wherein neither of the monitoring systems analyzes detected features at the portal to determine whether they are associated with a human except following receipt of a signal from the other monitoring system indicating expected entry of a human through the portal.

3. The method of claim 1, wherein predicting that an identified human will cross the portal into an adjacent workcell is based on proximity of the identified human to the portal.

4. The method of claim 1, wherein predicting that an identified human will cross the portal into an adjacent workcell is based on computationally projected motion of the identified human.

5. The method of claim 1, wherein the first and second workcells do not overlap.

6. The method of claim 1, wherein the second three-dimensional workcell is a monitored workcell and the first three-dimensional workcell is an unmonitored workcell, the method further comprising the steps of:
   computationally identifying, by the monitoring system of the monitored workcell, a human in the monitored workcell based on images recorded by at least one of the cameras therein;
   computationally predicting, based at least in part on the recorded images, that the identified human will cross the portal into the unmonitored workcell; and
   based on the computational prediction, electronically signaling a control system of the machinery to put the machinery into a safe state.

7. The method of claim 6, wherein putting the machinery into a safe state comprises shutting down the machinery.

8. The method of claim 6, wherein predicting that the identified human will cross the portal is based on proximity of the identified human to the portal.

9. The method of claim 6, wherein predicting that an identified human will cross the portal is based on computationally projected motion of the identified human.

10. A method of monitoring adjacent first and second three-dimensional workcells each of which includes controlled machinery, the first and second workcells overlapping along a shared region, at least the second workcell including a monitoring system comprising plurality of cameras distributed thereabout, the method comprising the steps of:
   computationally predicting that a human will cross a first portal in the shared region into the second workcell; and
   electronically signaling the monitoring system of the second workcell of expected crossing of the first portal by the identified first human,
   wherein the second workcell does not analyze detected features in the shared region to determine whether they are associated with a human except following receipt of the signal indicating expected entry of a human into the second workcell through the portal.

11. The method of claim 10, further comprising the steps of:
   computationally identifying, by the monitoring system of the second workcell, a second human in the second workcell based on images of the second workcell recorded by at least one of the cameras therein;
   computationally predicting, based at least in part on the recorded images, that the identified second human will cross a second portal in the shared region; and
   electronically signaling, by the monitoring system of the second workcell, a monitoring system of the first workcell of expected crossing of the second portal by the identified second human,
   wherein neither of the monitoring systems analyzes detected features in the shared region to determine whether they are associated with a human except following receipt of a signal from the other monitoring system indicating expected entry of a human through a portal.

12. The method of claim 11, wherein the first and second portals are the same portal located within the shared region.

13. The method of claim 11, wherein the first and second portals are the same portal located midway within the shared region.

14. The method of claim 11, wherein the first portal is a boundary of the second workcell and the second portal is a boundary of the first workcell.

15. The method of claim 11, wherein predicting that an identified human will cross a portal is based on proximity of the identified human to the portal.

16. The method of claim 11, wherein predicting that an identified human will cross a portal is based on computationally projected motion of the identified human.

17. The method of claim 11, further comprising the step of preventing crosstalk between cameras of the first and second workcells by causing otherwise interfering cameras to operate simultaneously in accordance with a noninterference scheme.

18. The method of claim 17, wherein the noninterference scheme comprises time-division multiplexing at least some interfering light sources.

19. The method of claim 17, wherein the noninterference scheme comprises wavelength-division multiplexing at least some interfering light sources.

20. The method of claim 17, wherein the cameras have light sources that emit radiation having a modulation frequency and the noninterference scheme comprises multiplexing the modulation frequencies of at least some interfering camera light sources.

21. The method of claim 17, wherein the noninterference scheme comprises a background interference map and the step of causing the cameras of the first and second workcells to operate simultaneously in accordance with the noninterference scheme comprises subtracting background illumination specified in the map.

* * * * *